US008871268B2

(12) United States Patent
Safranski et al.

(10) Patent No.: US 8,871,268 B2
(45) Date of Patent: Oct. 28, 2014

(54) BIODEGRADABLE POLYMERIC NETWORKS AND METHODS FOR MANUFACTURING THE SAME

(75) Inventors: David Safranski, Atlanta, GA (US); Kenneth Gall, Atlanta, GA (US); W. Robert Taylor, Stone Mountain, GA (US); Daiana Weiss, Atlanta, GA (US)

(73) Assignees: Georgia Tech Research Corporation, Atlanta, GA (US); Emory University, Atlanta, GA (US)

( * ) Notice: Subject to any disclaimer, the term of this patent is extended or adjusted under 35 U.S.C. 154(b) by 10 days.

(21) Appl. No.: 13/580,615

(22) PCT Filed: Feb. 23, 2011

(86) PCT No.: PCT/US2011/025950
§ 371 (c)(1),
(2), (4) Date: Sep. 4, 2012

(87) PCT Pub. No.: WO2011/106447
PCT Pub. Date: Sep. 1, 2011

(65) Prior Publication Data
US 2012/0322895 A1    Dec. 20, 2012

Related U.S. Application Data

(60) Provisional application No. 61/307,208, filed on Feb. 23, 2010.

(51) Int. Cl.
A61K 9/14      (2006.01)
C08F 120/18    (2006.01)
C08K 3/00      (2006.01)

(52) U.S. Cl.
CPC .................................. *C08K 3/00* (2013.01)
USPC ......... 424/487; 424/484; 424/486; 526/329.7

(58) Field of Classification Search
None
See application file for complete search history.

(56) References Cited

U.S. PATENT DOCUMENTS

| | | |
|---|---|---|
| 2002/0032281 A1 | 3/2002 | Harris |
| 2008/0145338 A1 | 6/2008 | Anderson et al. |
| 2009/0047256 A1 | 2/2009 | Bettinger et al. |
| 2009/0248141 A1 | 10/2009 | Shandas et al. |

OTHER PUBLICATIONS

Effect of poly(ethylene glycol) diacrylate concentration on network properties and in vivo response of poly(β-amino ester) networks (Safranski et al.; J Biomed Mater Res Part A: 96A: 320-329; published online Nov. 29, 2010).*
"Poly(Beta-amino esters) for Cardiovascular Applications" (Dissertation dated Dec. 2010 and authored by David Lee Safranski).*
US Patent Documents—None.*

(Continued)

*Primary Examiner* — Jeffrey T Palenik
(74) *Attorney, Agent, or Firm* — Troutman Sanders LLP; Ryan A. Schneider; Andrew D. Regan

(57) ABSTRACT

Methods of manufacturing a three-dimensional, biodegradable, thermoset polymeric network composition having desirable degradation and mechanical properties, comprising a macromer component cross-linked with a monofunctional acrylate-containing component. The macromer component can comprise a diacrylate-containing component polymerized with an amine-containing component, wherein the molar ratio of the diacrylate-containing component to the amine-containing component is greater than or equal to 1.

24 Claims, 22 Drawing Sheets

(56) References Cited

OTHER PUBLICATIONS

Safranski et al., "Temporal Control of Mechanical Properties of Degradable Poly(β-amino ester) Networks", Poster Abstract; Society for Biomaterials; (2011).*

Smith et al.; Acta Biomaterialia; 7 (2011) pp. 558-567.*

Keim, Terra, "Synthesis, Characterization, and Cyclic Stress-Influenced Degradation of a Poly(Ethylene) Glycol Based Poly(Beta-Amino Ester)", Georgia Institute of Technology, Atlanta, GA, 43 Pages, Dec. 2007.

International Search Report and Written Opinion for related PCT Patent Application No. PCT/US2011/025950 dated May 25, 2011.

* cited by examiner

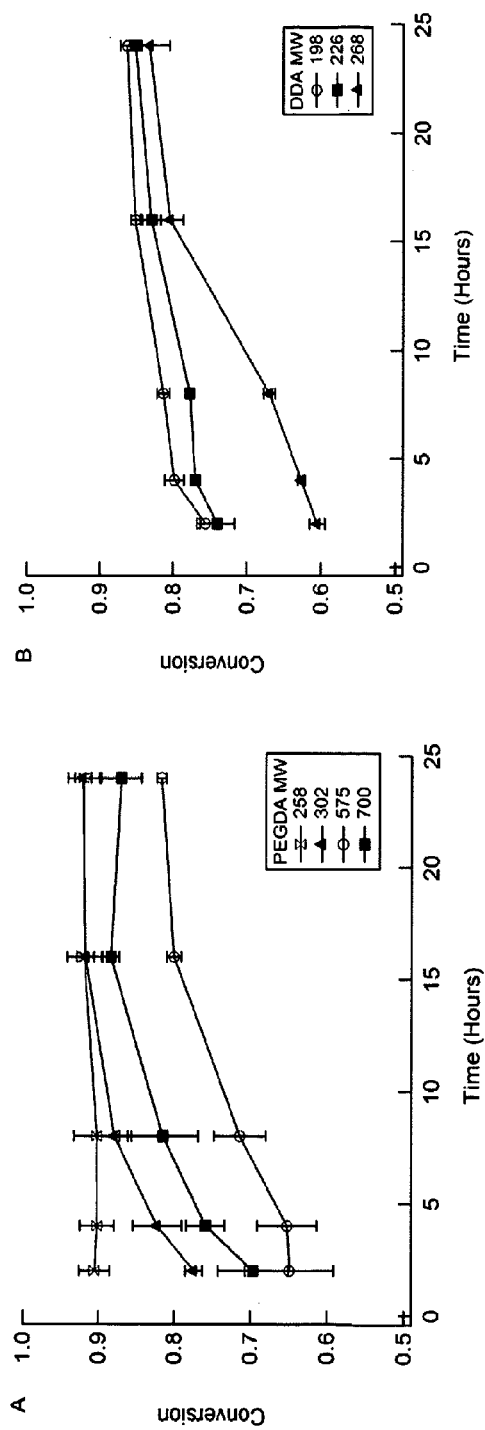
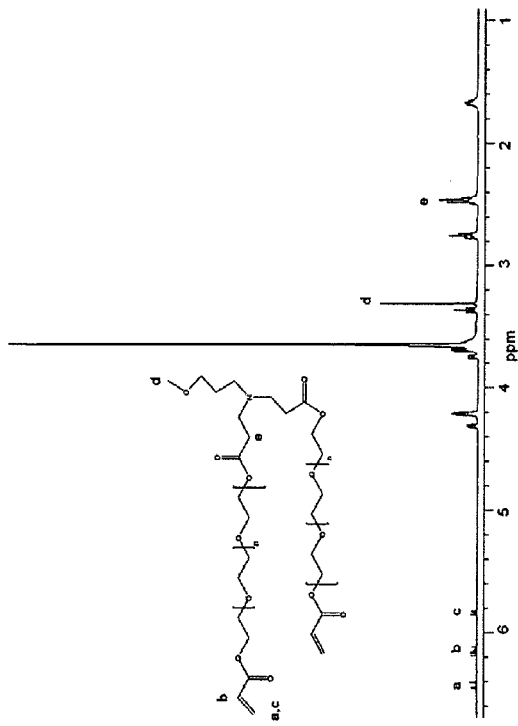
FIGURE 32
FIGURE 33

BIODEGRADABLE POLYMERIC NETWORKS AND METHODS FOR MANUFACTURING THE SAME

CROSS-REFERENCE TO RELATED APPLICATIONS

This application claims the benefit of International Patent Application Serial No. PCT/US2011/025950, filed 23 Feb. 2011, which claims the benefit of U.S. Provisional Patent Application Ser. No. 61/307,208, filed 23 Feb. 2010, which are incorporated herein by reference in their entirety as if fully set forth below.

BACKGROUND

1. Field

The various embodiments of the present invention relate to the syntheses and use of biodegradable polymer-based networks, wherein the chemical composition and thermal properties of the network may be altered to achieve specific degradation and mechanical properties.

2. Description of Related Art

Biodegradable polymers have been used in a multitude of applications, such as tissue scaffolds, orthopedic devices, and drug delivery devices. The ability to degrade is beneficial in these applications because it enables therapeutic drugs to be stored in the polymeric material and released without having to surgically remove the drug-eluting device. Many of these polymers, while biodegradable, demonstrate a loss in mechanical properties in a relatively short period of time, which can interfere with the overall performance of the polymeric material.

By way of example, poly(β-amino ester) ("PBAE") networks have gained attention as biodegradable polymers for use in biomedical applications. However, many PBAE networks, while biodegradable, are limited in thermo-mechanical properties and thus fall apart relatively easily. The thermo-mechanical properties of PBAE networks are mainly controlled by two parameters: (1) the glass transition temperature ("Tg") and (2) the crosslinking density. PBAE networks typically have a low Tg and high crosslinking density, and thus are lacking in sufficient toughness to survive implantation in biological applications. Further, many of the PBAE networks of the prior art are thermoplastic materials and thus not photopolymerizable.

Thus, polymeric materials that degrade over time, but maintain and/or improve their mechanical properties over time would be beneficial, particularly for biomedical applications.

BRIEF SUMMARY

Various embodiments of the present invention provide a three-dimensional polymeric network composition, comprising a biodegradable macromer component photopolymerized with a monofunctional acrylate-containing component. The macromer component can comprise a diacrylate-containing component polymerized with an amine-containing component. In exemplary embodiments, the molar ratio of the diacrylate-containing component to the amine-containing component is greater than or equal to 1:1.

The diacrylate-containing component can comprise one or more diacrylate compositions. For example, the diacrylate-containing component can comprise poly(ethylene glycol) diacrylate (PEGDA). In another example, the diacrylate-containing component can comprise hexanediol diacrylate (HDDA). In yet another example, the diacrylate-containing component can comprise a mixture of poly(ethylene glycol) diacrylate and hexanediol diacrylate, wherein a molar ratio of poly(ethylene glycol) diacrylate to hexanediol diacrylate is less than 1:1.

In exemplary embodiments, the molar ratio of the diacrylate-containing component to the amine-containing component in the macromer component is about 1.05:1 to about 1.25:1.

In some embodiments, the amine-containing component can comprise 3-methoxypropylamine (3MOPA).

In other embodiments, the monofunctional acrylate-containing component can comprise methyl methacrylate (MMA).

Additionally, in some embodiments the composition can further comprise a photoiniator. The photoiniator can be, for example, 2-hydroxy-1-[4-(hydroxyethoxy)phenyl]-2-methyl-1-propanone.

The three-dimensional polymeric network composition can comprise about 45 weight percent of the macromer component and about 55 weight percent of the monofunctional acrylate-containing component.

In some embodiments, the macromer component is poly(ethylene glycol) diacrylate and hexanediol diacrylate polymerized with 3-methoxypropylamine, and the monofunctional acrylate-containing components is methyl methacrylate.

The composition can further comprise an active agent.

Further, the monofunctional acrylate-containing component has a higher glass transition temperature than the macromer component. More specifically, the glass transition temperature of the monofunctional acrylate-containing component is at least 20 degrees higher than the glass transition temperature of the macromer component.

Alternative embodiments of the present invention provide a method of manufacturing a three-dimensional polymeric network composition by polymerizing a diacrylate-containing component with an amine-containing component to form a biodegradable macromer component, wherein a molar ratio of the diacrylate-containing component to the amine-containing component is greater than or equal to 1:1, and photopolymerizing the macromer component with a monofunctional acrylate-containing component.

The method can further comprise mixing two or more diacrylate compositions to produce the diacrylate-containing component.

The method can further comprise disposing an active agent in the macromer and monofunctional acrylate-containing components.

In some embodiments, the diacrylate-containing component can comprise poly(ethylene glycol) diacrylate. In other embodiments, the diacrylate-containing component can comprise hexanediol diacrylate. In alternative embodiments, the diacrylate-containing component comprises poly(ethylene glycol) diacrylate and hexanediol diacrylate. More specifically, the molar ratio of the diacrylate-containing component to the amine-containing component in the macromer component can be about 1.05:1 to about 1.25:1.

In yet other embodiments, the three-dimensional polymeric network composition can comprise about 45 weight percent of the macromer and about 55 weight percent of the monofunctional acrylate-containing component.

Alternative embodiments provide a method of therapeutically treating a subject using a three-dimensional polymeric network composition, the method comprising contacting a mixture with a treatment location of the subject. The mixture can comprise a biodegradable macromer component, a monofunctional acrylate-containing component, and an active agent, wherein the macromer component comprises a diacrylate-containing component polymerized with an amine-containing component, and wherein a molar ratio of the diacrylate-containing component to the amine-containing component in the macromer component is greater than or equal to 1:1. The method further comprises photopolymerizing the macromer component with the monofunctional acrylate-containing component of the mixture to form the three-dimensional polymeric network having an active agent disposed therein at the treatment location.

In some embodiments, the diacrylate-containing component comprises poly(ethylene glycol) diacrylate and hexanediol diacrylate.

The molar ratio of the diacrylate-containing component to the amine-containing component in the macromer component can be about 1.05:1 to about 1.25:1.

Further, the mixture can comprise about 45 weight percent of the macromer component and about 55 weight percent of the monofunctional acrylate-containing component.

The foregoing summarizes only a few aspects of the present invention and is not intended to be reflective of the full scope of the present invention as claimed. Additional features and advantages of the present invention are set forth in the following description, may be apparent from the description, or may be learned by practicing the present invention. Moreover, both the foregoing summary and following detailed description are exemplary and explanatory and are intended to provide further explanation of the present invention as claimed.

BRIEF DESCRIPTION OF THE FIGURES

FIG. 32A-B graphically illustrates conversion of polymeric networks, in accordance with exemplary embodiments of the present invention.

FIG. 33 provides a nuclear magnetic resonance spectra of polymeric networks, in accordance with exemplary embodiments of the present invention.

DETAILED DESCRIPTION

Figure 1:
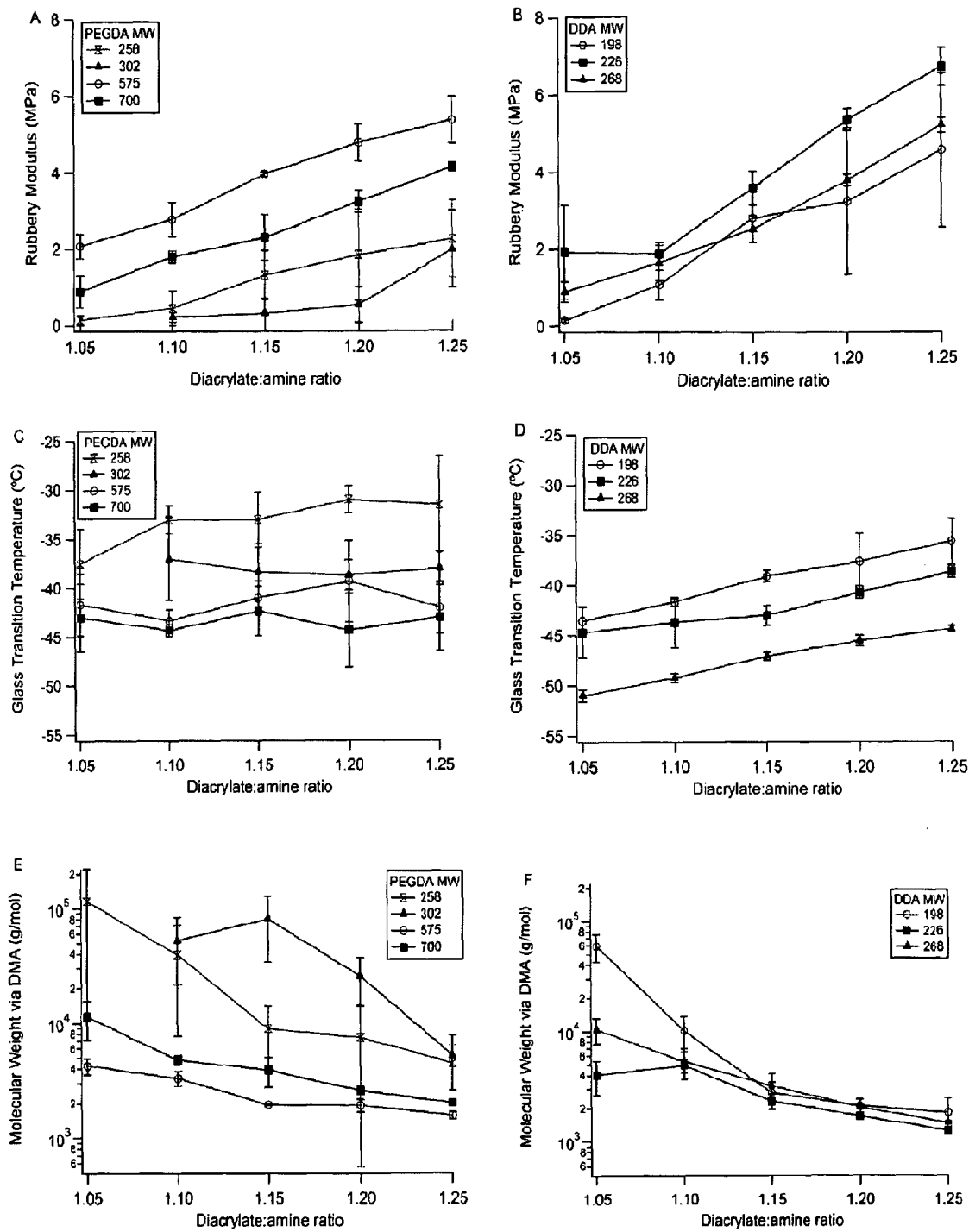
FIGS. 1A-F graphically illustrate mechanical characteristics of polymeric networks having varying PEGDA and HDDA number average molecular weights and diacrylate to amine molar ratios, in accordance with exemplary embodiments of the present invention.

Referring now to the figures, wherein like reference numerals represent like parts throughout the several views, exemplary embodiments of the present invention will be described in detail. Throughout this description, various components can be identified as having specific values or parameters, however, these items are provided as exemplary embodiments. Indeed, the exemplary embodiments do not limit the various aspects and concepts of the present invention as many comparable parameters, sizes, ranges, and/or values can be implemented.

It should also be noted that, as used in the specification and the appended claims, the singular forms "a," "an," and "the" include plural references unless the context clearly dictates otherwise. For example, reference to a component is intended also to include composition of a plurality of components. References to a composition containing "a" constituent is intended to include other constituents in addition to the one named. Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Values may be expressed herein as "about" or "approximately" one particular value, this is meant to encompass the one particular value and other values that are relatively close but not exactly equal to the one particular value. By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The various embodiments of the present invention provide photopolymerizable, biodegradable, three-dimensional, thermoset polymeric networks and methods for manufacturing the same. The polymeric networks generally comprise at least one high glass transition temperature ("Tg"), mechanical-strength providing component and at least one low Tg component. To increase the thermo-mechanical properties of the network, the amount of the high Tg, mechanical-strength providing component can be increased. Contrastingly, to increase the degradation properties of the network, the amount of the low Tg component can be increased. Therefore, the polymeric networks can be manipulated to achieve desired degradation and mechanical properties by manipulating the balance of the components. The polymeric network disclosed herein combines low Tg components having high crosslinking densities with high Tg components having low crosslinking densities, such that, as the low Tg components degrade away, the high Tg, low crosslinking density components remain, thus increasing the mechanical properties as the polymeric material degrades.

The photopolymerizable, biodegradable, three-dimensional, thermoset polymeric networks disclosed herein comprise a macromer component photopolymerized with a monofunctional acrylate-containing component. The macromer component comprises a diacrylate-containing component and an amine-containing component. That is, the diacrylate-containing component and the amine-containing component undergo step-growth polymerization to form the macromer component. The macromer component is then photopolymerized with the monofunctional acrylate-containing component. An active agent, as defined below, can be added to the macromer and/or monofunctional acrylate. A photoiniator can also be added to the mixture of the monofunctional acrylate and/or macromer to enable the photopolymerization of the polymeric network.

The macromer component comprises a diacrylate-containing component polymerized with an amine-containing component and is formed when the diacrylate-containing component and the amine-containing undergo step-growth polymerization. In the macromer component, the diacrylate to amine molar ratio in the macromer component is greater than 1:1. In exemplary embodiments, the diacrylate to amine molar ratio ranges from 1.05:1 to 1:25:1. The diacrylate to amine molar ratio being greater than 1:1 allows the polymeric network to photopolymerize. Specifically, such diacrylate to amine ratios enable the amine-containing component to completely or almost completely react with the diacrylate-containing component, therefore leaving only diacrylate endgroups. This is beneficial because amine endgroups prevent the polymeric network from photopolymerizing. Contrastingly, diacrylate endgroups enable photopolymerization of the polymeric network and facilitate degradation.

The diacrylate-containing component of the macromer component can comprise any diacrylate composition. Further, the diacrylate-containing component can comprise one or more diacrylate compositions. The diacrylate compositions can vary in number average molecular weight. One skilled in the art will appreciate that larger number average molecular weight diacrylate compositions will create longer polymeric chains during the step-growth polymerization process. Contrastingly, smaller number average molecular weight diacrylate compositions will create shorter polymeric chains during the step-growth polymerization process. Further, diacrylate compositions comprise unique mechanical and degradation properties. Therefore, the diacrylate-containing component can be tailored to desired biological applications by selecting a diacrylate composition or a mixture of diacrylate compositions selected based on the desired number average molecular weight, mechanical, and degradation properties.

Examples of diacrylate compositions include poly(ethylene glycol) diacrylate ("PEGDA") and hexanediol diacrylate ("HDDA"). PEGDA has a higher degradation rate in comparison to HDDA due to PEGDA's hydrophilic properties. Accordingly, one skilled in the art will understand that PEGDA, HDDA, and mixtures thereof influence the overall degradation properties of the polymeric network.

Exemplary embodiments of the diacrylate-containing component comprise a mixture of PEGDA and HDDA. It shall be understood, however, that while the examples described herein reference a diacrylate component comprising a mixture of PEGDA and HDDA, other diacrylate compositions, including diacrylate compositions solely comprising PEGDA or solely comprising HDDA, can make up the diacrylate-containing component. PEGDA has a higher degradation rate than HDDA. Therefore, to increase the degradation rate of the polymeric network, the amount of PEGDA in the diacrylate-containing component should be increased. Conversely, to decrease the degradation rate of the polymeric network, the amount of HDDA in the diacrylate-containing component should be increased. FIGS. 1A-F graphically illustrate the mechanical characteristics of polymeric networks utilizing PEGDA and HDDA of varying number average molecular weights. The data of FIGS. 1A-F provide those skilled in the art with guidance in selecting a polymeric network having specific mechanical properties.

Exemplary embodiments of the diacrylate-containing component comprise a mixture of PEGDA and HDDA, wherein the PEGDA:HDDA molar ratio is less than or equal to 1:1. For example, the PEGDA:HDDA molar ratio can be 10:90 and 25:75. As graphically illustrated in FIG. 2A, the fastest degradation rate of the polymeric network occurs when the PEGDA:HDDA molar ratio is 25:75 and the slowest degradation rate of the polymeric network occurs when the PEGDA:HDDA molar ratio is 0:100 (i.e., solely HDDA).

Figure 2:
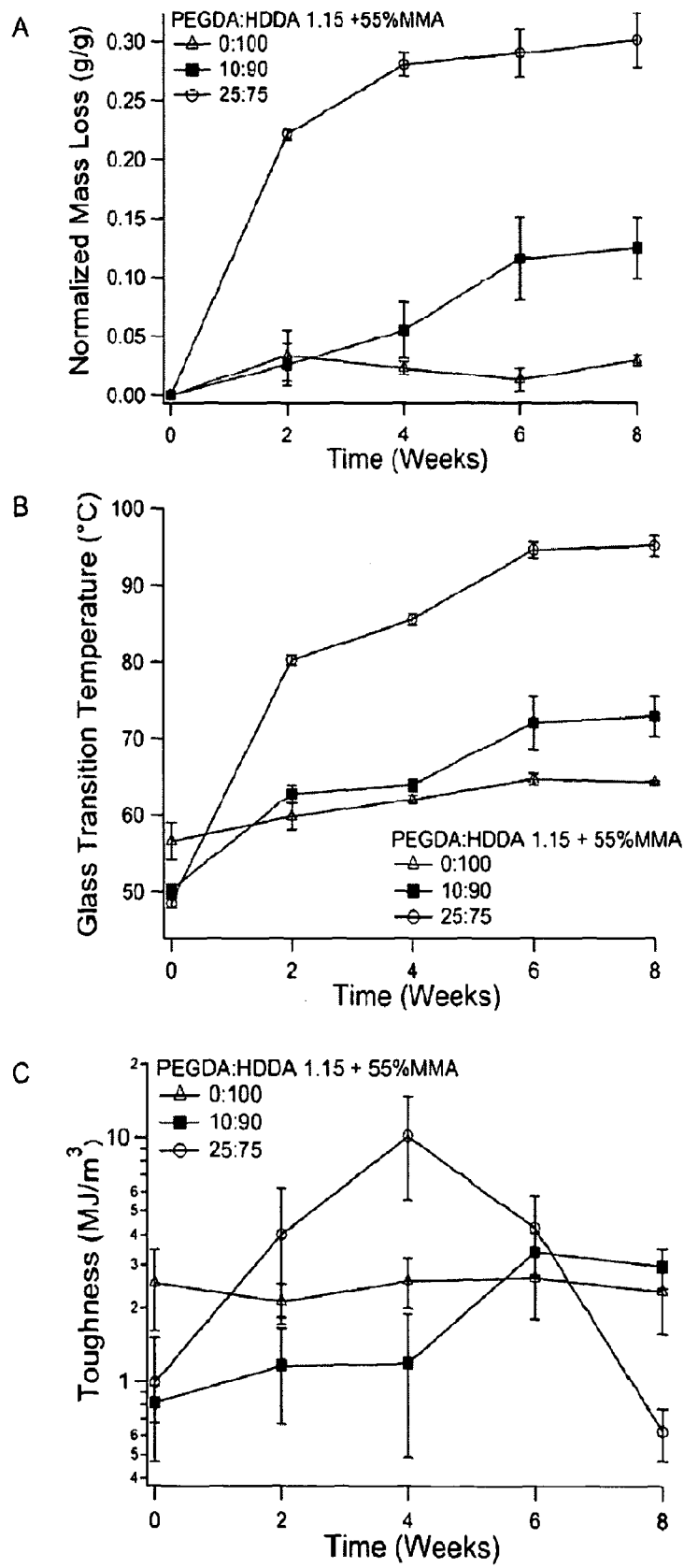
FIGS. 2A-C graphically illustrate mechanical and degradation properties of polymeric networks having varying PEGDA to HDDA molar ratios, in accordance with exemplary embodiments of the present invention.
Figure 3:
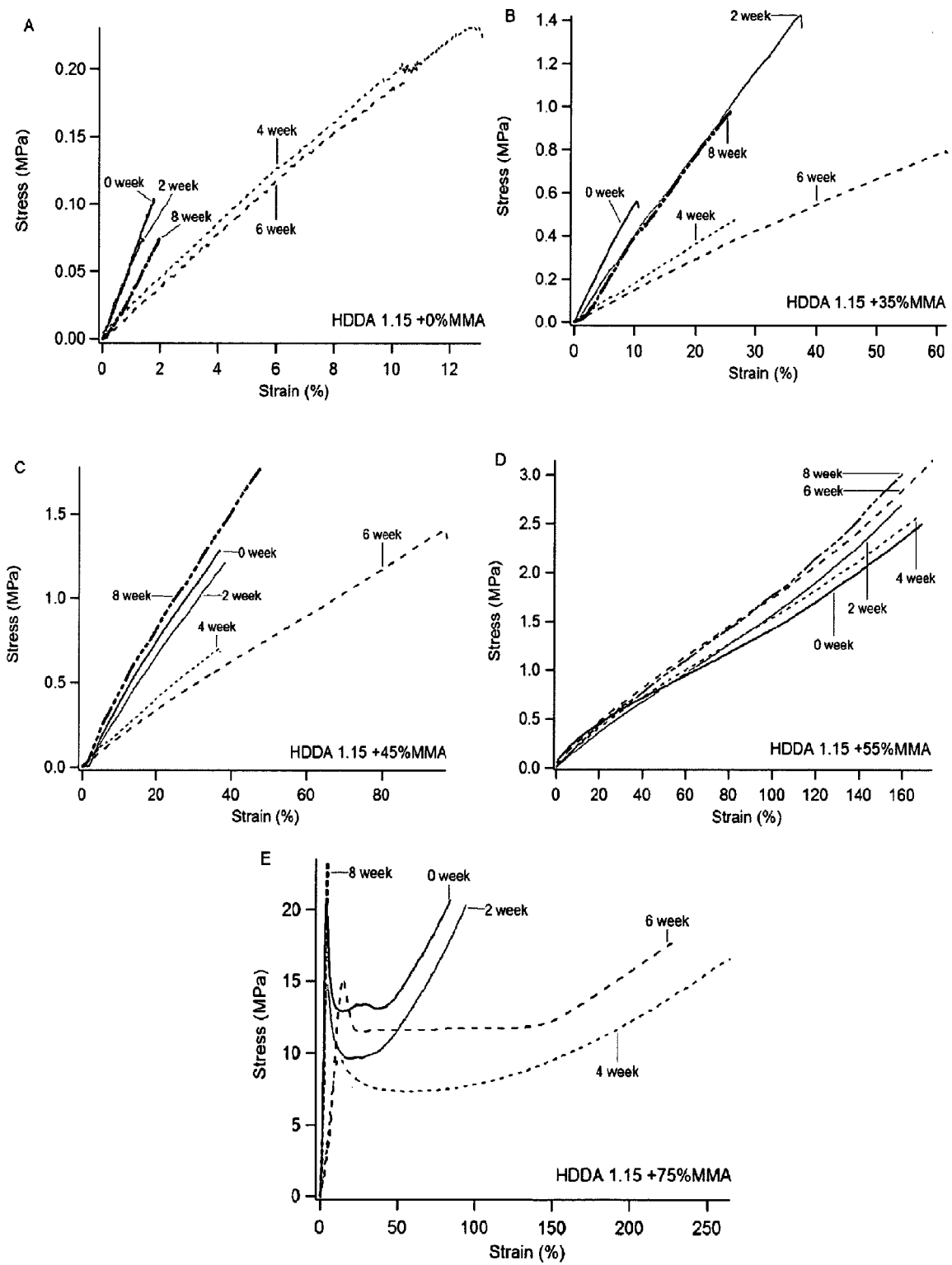
FIGS. 3A-E graphically illustrate stress-strain curves of polymeric networks of varying MMA weight percents, in accordance with exemplary embodiments of the present invention.

As FIG. 2B graphically illustrates, the glass transition temperatures of the polymeric networks are the highest when the PEGDA:HDDA molar ratio is 25:75. One skilled in the art will understand that mechanical and degradation properties are interrelated in that one property can be manipulated at the expense of the other property. For example, PEGDA provides mechanical strength to the polymeric network, as illustrated in FIG. 2B, but also increases the degradation rate of the polymeric network, as illustrated in FIG. 2A. Therefore, if PEGDA is not included in the diacrylate-containing component, mechanical properties are traded in the interest of the polymeric network having a slower degradation rate. One skilled in the art will understand that the PEGDA:HDDA molar ratio can be manipulated to achieve desired degradation and mechanical properties. FIG. 2C graphically illustrates the toughness of polymeric networks having varying PEGDA:HDDA ratios.

The diacrylate-containing component can be reacted and polymerized with an amine-containing component to produce the macromer component. The amine-containing component can comprise any primary or secondary amine. For example, the amine-containing component can comprise primary amines, methylamine, ethylamine, butylamine, propylamine, and/or isoproplyamine. As another example, the amine-containing component can comprise secondary amines, dimethylamine, ethylpropylamine, and/or diethylamine. In exemplary embodiments, the amine-containing component comprises primary amine, 3-methoxypropylamine ("3MOPA"). While the examples described herein specifically refer to 3MOPA, it shall be understood that any primary or secondary amine, or combinations thereof, can be used in the amine-containing component.

Once selected, the diacrylate-containing component and amine-containing component can be combined to form the macromer component. Specifically, the diacrylate-containing component and the amine-containing component undergo a step-growth polymerization to form the macromer component. As stated above, the diacrylate:amine ratio of the macromer component is important because it determines whether the polymeric network can be photopolymerized.

The macromer component, which comprises the diacrylate-component and the amine-containing component, can then be photopolymerized with a monofunctional acrylate. The macromer component generally comprises biodegradable, low Tg components, and thus is lacking in mechanical strength. It is therefore desirable to photopolymerize the macromer component with a monofunctional acrylate, which improves the mechanical strength of the polymeric network due to their high Tg properties and low crosslinking densities. The balance between the macromer component and the monofunctional acrylate provide a polymeric network that stiffens as it degrades. Specifically, the balance between the macromer component and the monofunctional acrylate enable the polymeric network to have initial elastomeric mechanical properties that transition to brittle and/or elastic-plastic properties as it degrades. More specifically, the balance between the macromer component and the monofunctional acrylate enable the polymeric network to increase in toughness, modulus, strength, and strain-to-failure as it degrades.

Examples of monofunctional acrylates include methyl methacrylate, 1-hexadecyl methacrylate, 2-ethylhexyl acrylate, 2-methoxyethyl methacrylate, 2-naphthyl acrylate, 2-phenylethyl acrylate, and 4-chlorophenyl acrylate. In exemplary embodiments, the monofunctional acrylate is methyl methacrylate ("MMA"). It shall be understood, however, that while MMA is described in the various examples described herein, other monofunctional acrylates can also be used for the monofunctional acrylate-containing component.

Because of the unique mechanical and degradation properties of the macromer component and the monofunctional acrylate, one skilled in the art will understand that the weight percents of the macromer component and the monofunctional acrylate in the polymeric network can be manipulated to achieve desired degradation and mechanical properties. In exemplary embodiments, the polymeric network comprises about 55 weight percent of the monofunctional acrylate and about 45 weight percent of the macromer component. In other embodiments, however, the polymeric network can comprise 0-75 weight percent of the monofunctional acrylate. One skilled in the art will understand that an increase in monofunctional acrylate weight percent (and thus a decrease in macromer component weight percent) will improve the mechanical properties of the polymeric network and increase the Tg of the overall polymeric network. Conversely, decreasing the monofunctional acrylate weight percent (therefore increasing the macromer component weight percent) will improve the degradation properties of the polymeric network. FIGS. 3A-E provide stress-strain curves of polymeric networks having varying weight percents of MMA, in accordance with exemplary embodiments of the present invention.

Once the macromer component and the monofunctional acrylate are provided, a photoinitiator can be added to the monofunctional acrylate and/or the macromer component. The photoiniator can be any photoiniator, however in exemplary embodiments the photoiniator is 2-hydroxy-1-[4-(hydroxyethoxy)phenyl]-2-methyl-1-propanone.

An "active agent" can also be included in the polymeric network. As used herein, "active agent" means a pharmaceutical or biotechnological compound or construct that induces a biological, pharmacological, or cosmetic effect on an organism. An active agent can be a compound, molecule, chemical, or biological construct that provides a physical or chemical change to an existing condition.

The polymeric network of the present invention permits the delivery of active agents, including therapeutics, diagnostics, and prophylactics that may or may not be delivered using polymeric networks currently known in the art. Active agents of the present invention include, but are not limited to: agents for gene therapy; nucleic acids; DNA; RNA; polynucleotides; peptides; proteins; amino acids; carbohydrates; viruses; antigens; immunogens; antibodies; chemical or biological materials or compounds that induce a desired biological or pharmacological effect; anti-infectives, such as antibiotics and antiviral agents; analgesics and analgesic combinations; anorexics; antihelminthics; antiarthritics; antiasthmatic agents; anticonvulsants; antidepressants; antidiabetic agents; antidiarrheals; antihistamines; antiinflammatory agents; antimigraine preparations; antinauseants; antineoplastics; antiparkinsonism drugs; antipruritics; antipsychotics; antipyretics; antispasmodics; anticholinergics; sympathomimetics; xanthine derivatives; cardiovascular preparations including potassium and calcium channel blockers, beta-blockers, alpha-blockers, and antiarrhythmics; antihypertensives; diuretics and antidiuretics; vasodilators including general coronary, peripheral and cerebral; central nervous system stimulants; vasoconstrictors; cough and cold preparations, including decongestants; hormones, such as estradiol and other steroids, progesterone and derivatives, testosterone and derivatives; corticosteroids; angiogenic agents; antiangeogenic agents; hypnotics; immunosuppressives; muscle relaxants; parasympatholytics; nicotine; psychostimulants; sedatives; tranquilizers; ionized and nonionized active agents; cells; and compounds of either high or low molecular weight, among others. An active agent can further comprise a particle or plurality of particles, wherein a particle may induce a biological, pharmacological or cosmetic effect on an organism. Particles can comprise metals, non-metals, ceramics, polymers, organics, inorganics, composites, or combinations thereof. Examples of particles comprise, but are not limited to, liposomes, viruses, polymer particles that encapsulate active agents, which are released over time, coated particles that facilitate delivery of an active agent, wherein the particles comprise gold, polystyrene, glass, tungsten, platinum, ferrite, glass, or latex, among others. The active agents may have local effects, such as providing for a local anesthesia, or may have systemic effects.

One skilled in the art will understand that active agents can be of various weight percents in the polymeric network. For example, in some embodiments, the active agent can comprise up to 70 weight percent of the polymeric network. It shall also be understood that degradation and mechanical properties of the polymeric network directly influence how the active agent is delivered to aid in the treatment of a subject. For example, the polymeric network can be designed to provide a quick, anesthetic delivery of the active agent to the patient or to provide slow, long-term delivery of the active agent to the patient.

Figure 39:
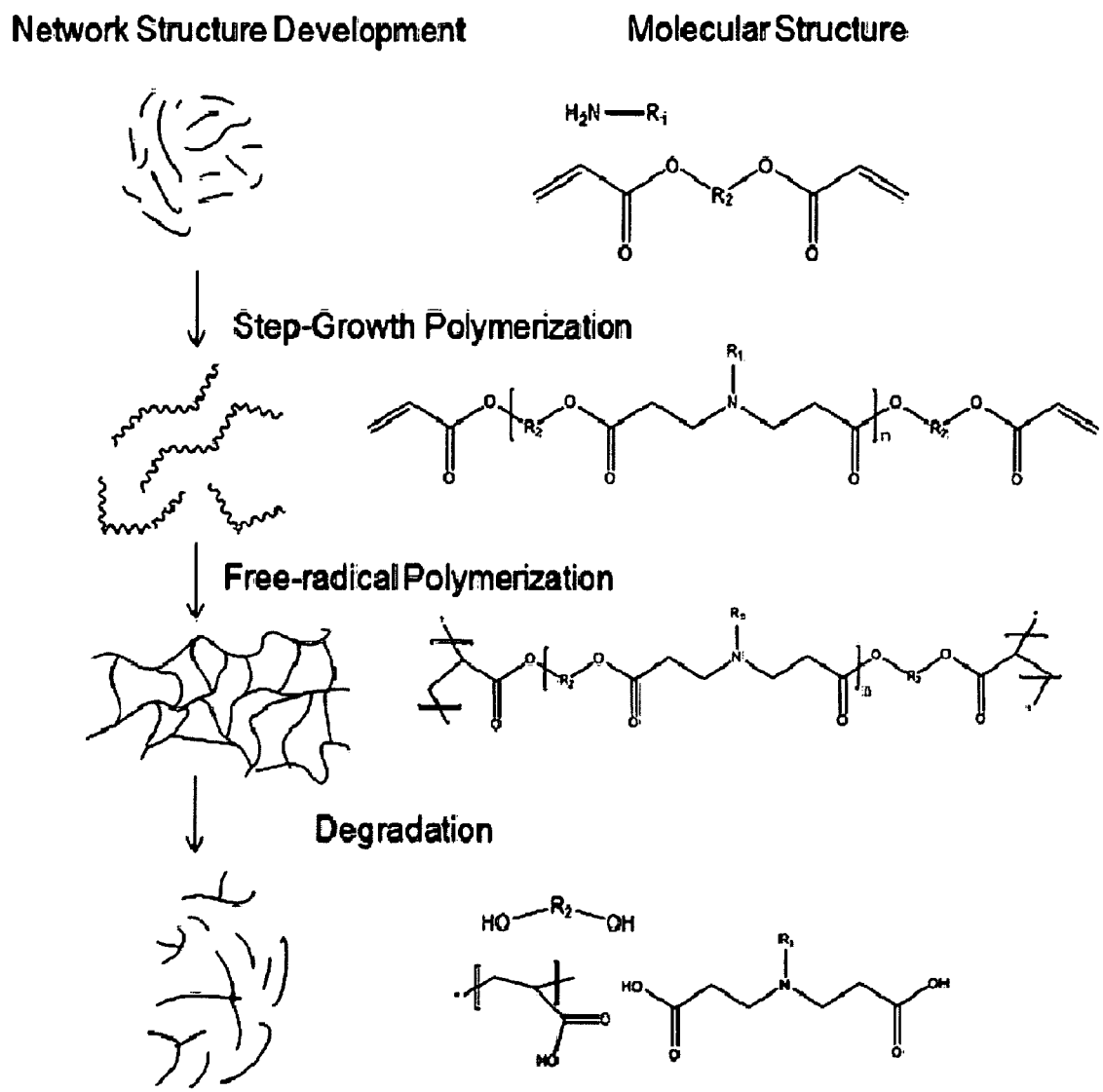
FIG. 39 illustrates the development and degradation of polymeric networks, in accordance with exemplary embodiments of the present invention.

The polymeric network can then be photopolymerized. Because the polymeric network is a thermoset material, it can be injected into or disposed on a treatment site of a subject and cured in vivo. The curing of the polymer network disclosed herein do not release the high heats of those in the prior art, thus providing advantages to doctors and the like who want to directly inject and cure the polymeric network in vivo. The development and degradation of the polymeric networks is illustrated in FIG. 39.

EXAMPLES

The various embodiments of the present invention are illustrated by the following non-limiting examples.

Example 1

Polymeric Networks Comprising HDDA, 3 MOPA, and MMA

Acrylate-terminated macromers were formed via a step-growth polymerization of HDDA and 3MOPA at molar ratios of 1.05:1 to 1.20:1. The step-growth polymerization reaction proceeded at about 90° C. for about 24 hours on a rotary shaker at about 200 rotations per minute (rpm). The photoiniator, Irgacure 2959, was added at 0.5 weight percent and the polymer network were photopolymerized with a UV lamp at 365 nanometers (nm). MMA was added to select macromers at varying weight percent ratios prior to photopolymerization.

Materials of 1 square centimeter ($cm^2$) cut from 1 millimeter (mm) thick sheets were degraded in phosphate buffered saline, pH=7.0, at 37° C. for 12 weeks. Samples were massed at predetermined times and removed from the phosphate buffered saline. Samples were then dried for 24 hours and massed again to determine the mass loss.

Two methods were used for mechanical characterization. Dynamic mechanical analysis (TA Q800) determined the thermomechanical properties from about −100° C. to 100° C. at a rate of about 3° C./minute. The same were run in tension under strain control of about 0.1%. Standard tensile testing (MTS Insight 2) of ASTM type IV dogbone samples occurred at a strain rate of $10^{-3}$ at about 37° C. in a Thermcraft chamber to determined the bulk mechanical properties.

Figure 4:
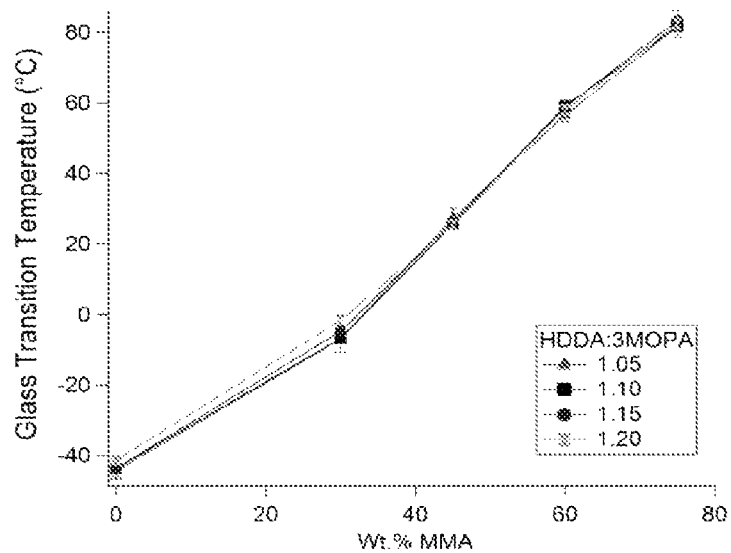
FIG. 4 graphically illustrates glass transition temperature of polymeric networks having varying diacrylate to amine molar ratios as a function of MMA weight percent, in accordance with exemplary embodiments of the present invention.

Since the macromer base without MMA is highly crosslinked, it has rather poor mechanical properties at the temperature of interest. Further, the Tg is far below the operating temperature, thus the mechanical properties are rather weak. The initial Tg is near −40° C., thus the Tg needed to be increased some 70° C. to be near body temperature. The glass transition temperature was increased by adding MMA, as shown in FIG. 4.

Figure 5:
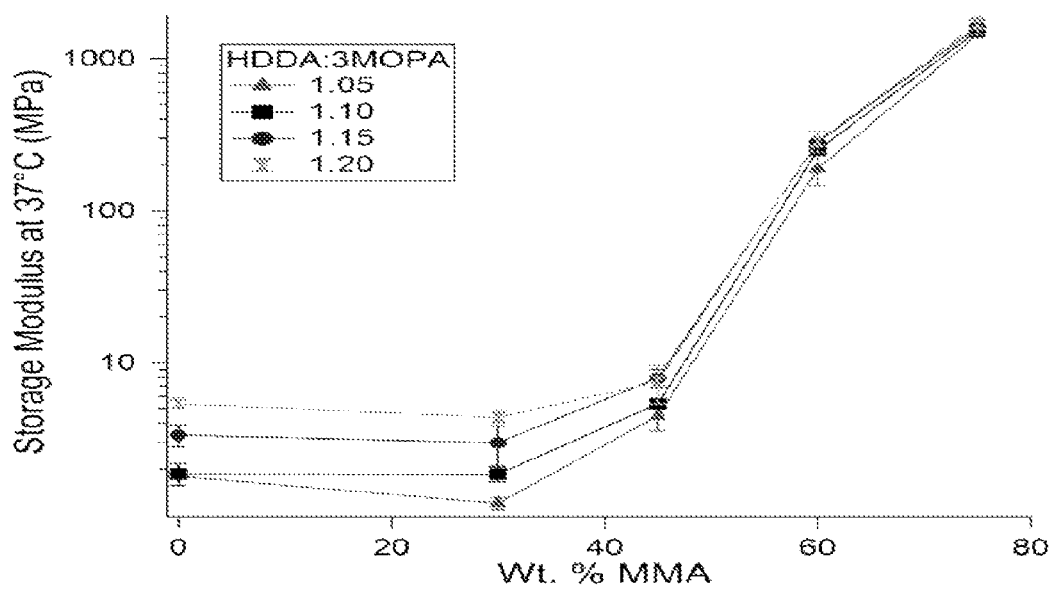
FIG. 5 graphically illustrates storage modulus of polymeric networks having varying diacrylate to amine molar ratios as a function of MMA weight percent, in accordance with exemplary embodiments of the present invention.

By varying the diacrylate to amine molar ratio from 1.05:1 to 1.20:1, the molecular weight of the resultant macromer can be varied. Four different molecular weight macromers were mixed with MMA. The modulus of these materials can be found in FIG. 5. The modulus starts to greatly increase beyond 45 weight percent (wt %) MMA. The materials remain rubbery below 45 wt % MMA, then transition to a glassy rigid plastic beyond 45 wt % MMA.

Figure 6:
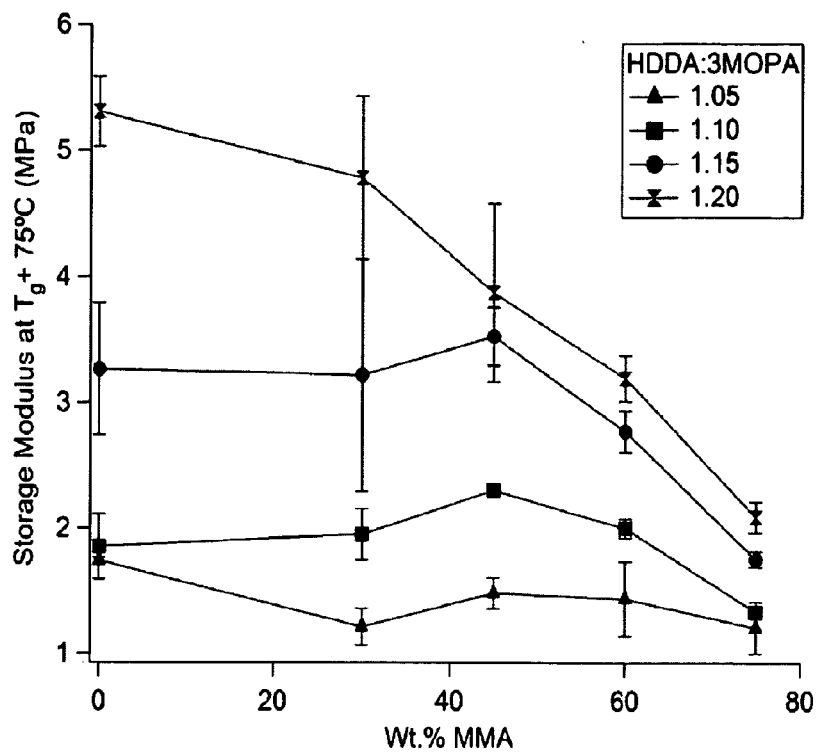
FIG. 6 graphically illustrates storage modulus of polymeric networks having varying diacrylate to amine molar ratios as a function of MMA weight percent, in accordance with exemplary embodiments of the present invention.

If the modulus is taken at a relative temperature from the Tg and in the rubbery regime, the curves become normalized. The storage modulus at a temperature of Tg+75° C. for each composition as a function of weight percent MMA is shown in FIG. 6. It is expected that there will be a decrease in the rubbery modulus because adding MMA to the network decreases the crosslinking density, therefore decreasing the rubbery modulus.

Figure 7:
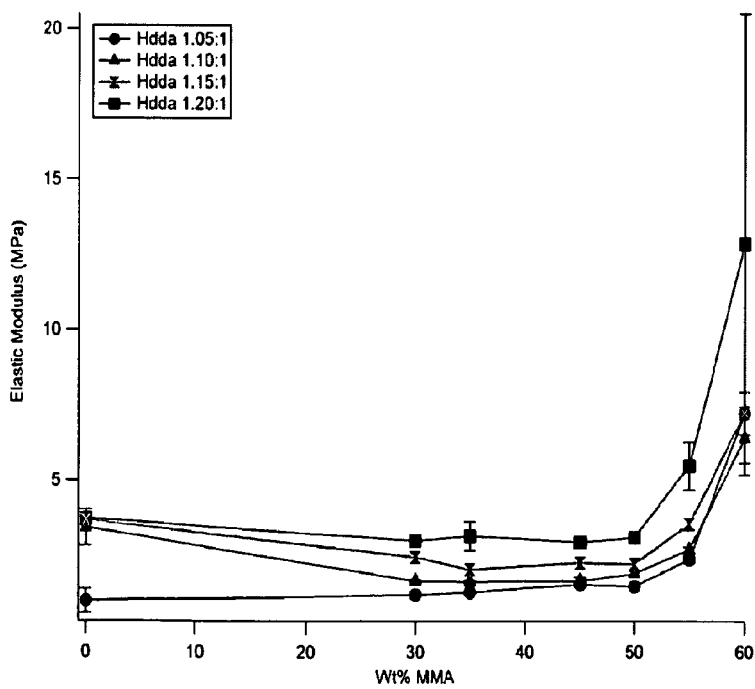
FIG. 7 graphically illustrates elastic modulus of polymeric networks having varying diacrylate to amine molar ratios as a function of MMA weight percent, in accordance with exemplary embodiments of the present invention.
Figure 8:
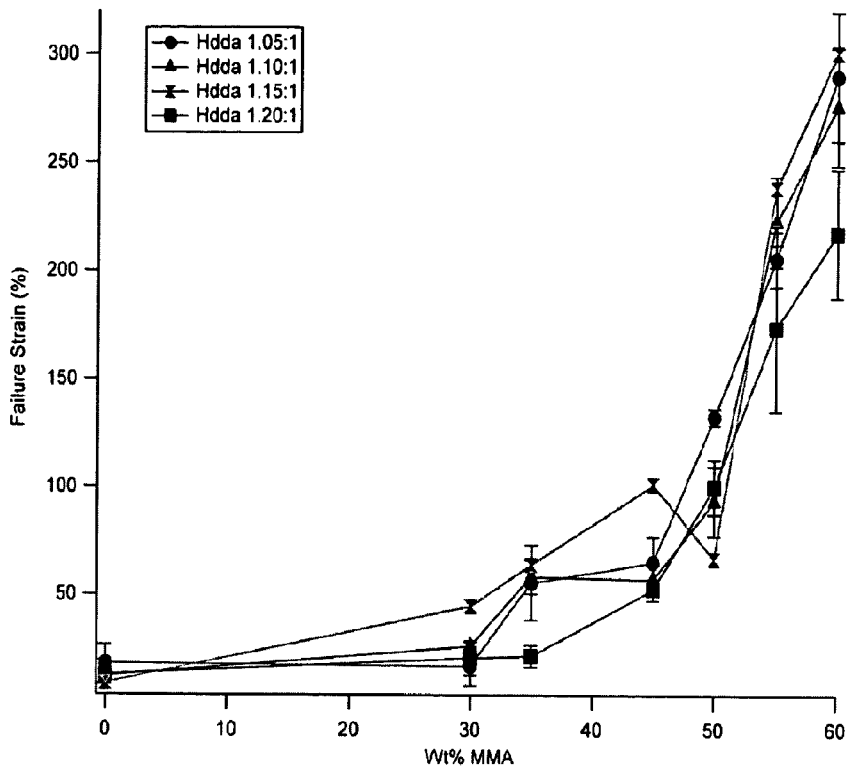
FIG. 8 graphically illustrates failure strain of polymeric networks having varying diacrylate to amine molar ratios as a function of MMA weight percent, in accordance with exemplary embodiments of the present invention.
Figure 9:
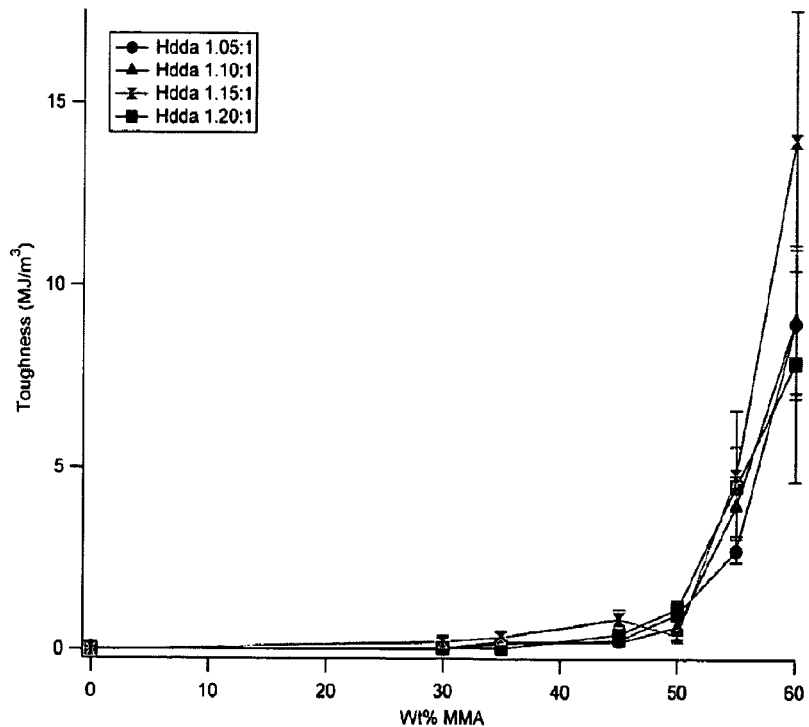
FIG. 9 graphically illustrates toughness of polymeric networks having varying diacrylate to amine ratios as a function of MMA weight percent, in accordance with exemplary embodiments of the present invention.
Figure 10:
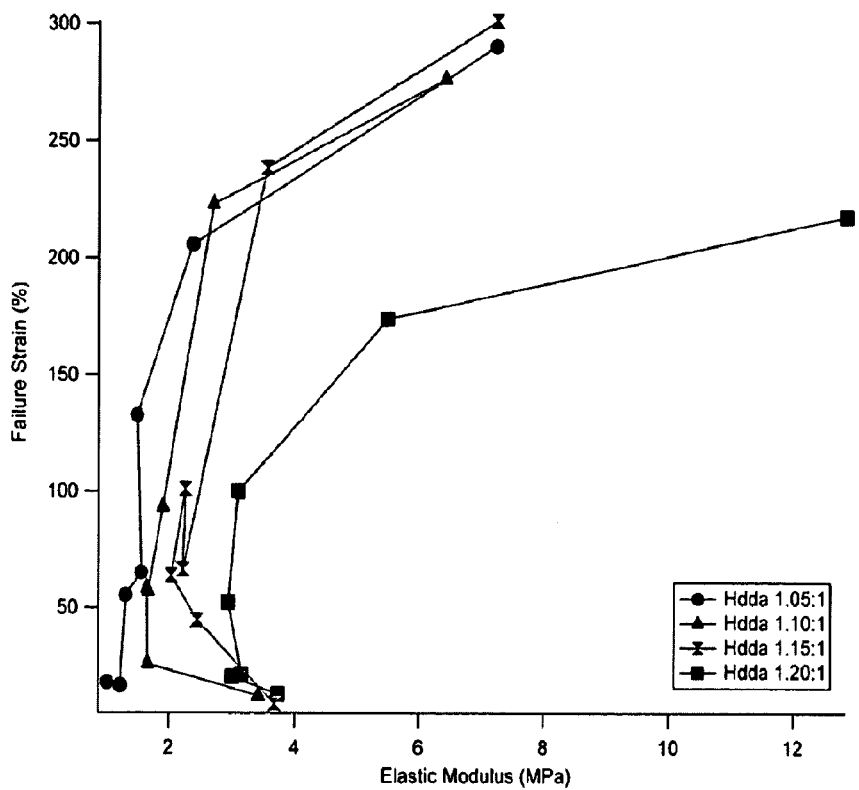
FIG. 10 graphically illustrates failure strain of polymeric networks having varying diacrylate to amine molar ratios as a function of elastic modulus, in accordance with exemplary embodiments of the present invention.
Figure 11:
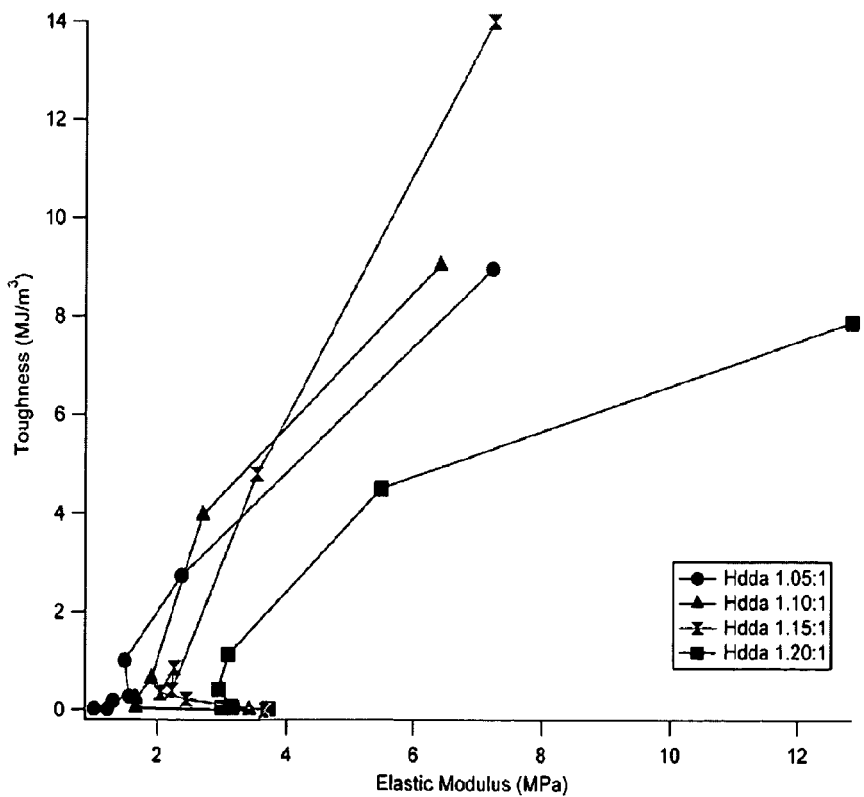
FIG. 11 graphically illustrates toughness of polymeric networks having varying diacrylate to amine molar ratios as a function of elastic modulus, in accordance with exemplary embodiments of the present invention.

FIGS. 7-11 were produced from stress-strain curves via Insight 2 tensile tester. FIG. 7 shows the increase in elastic modulus as wt % of MMA is increased for four molecular weight macromers. The elastic modulus did not change until near 55 to 60 wt % MMA. While this varies slightly from FIG. 5, the elastic modulus of a tensile tester varies slightly from the modulus of a DMA, the variation is often less than an order of magnitude. FIG. 8 shows the relationship between failure strain and MMA concentration. The failure strain increases as the MMA concentration increases because the Tg is increasing. FIG. 9 shows the relationship between toughness and MMA concentration. Again, toughness increases as MMA concentration increases because the failure strain is increasing. FIGS. 10 and 11 show the relationships between (1) failure strain and modulus and (2) toughness and modulus, respectively.

Figure 12:
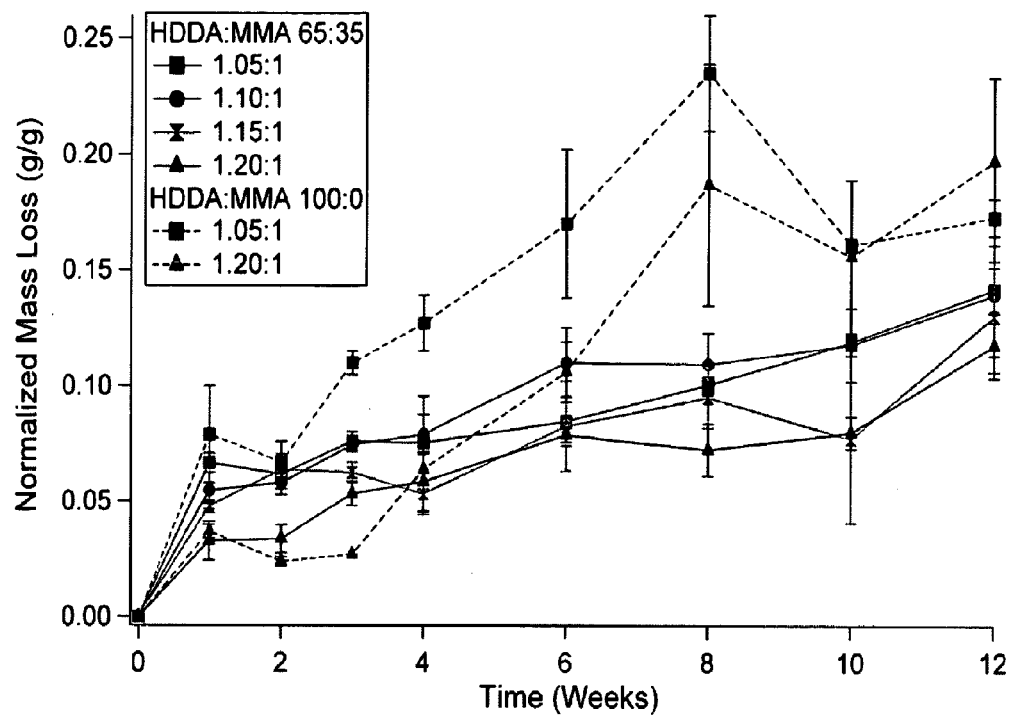
FIG. 12 graphically illustrates normalized mass loss of polymeric networks having varying diacrylate to amine molar ratios and MMA weight percents, in accordance with exemplary embodiments of the present invention.
Figure 13:
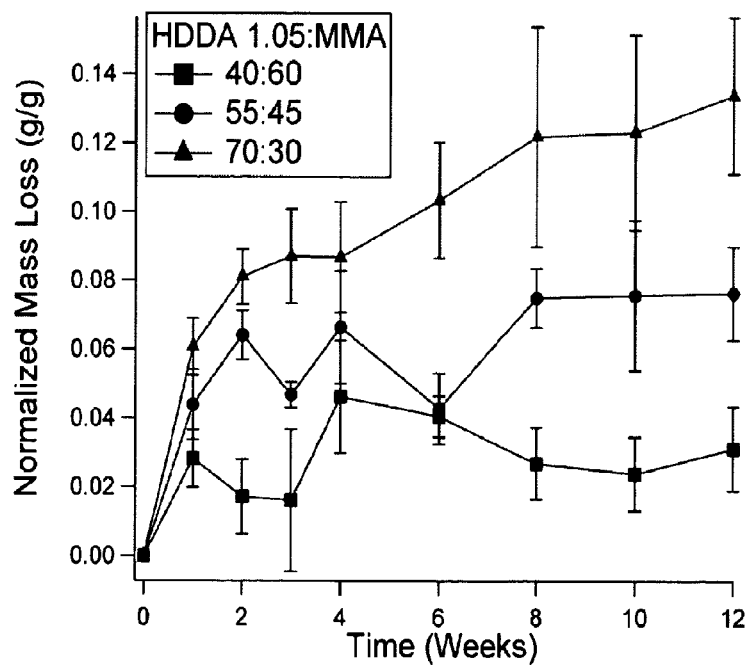
FIG. 13 graphically illustrates normalized mass loss of polymeric networks having varying MMA weight percents, in accordance with exemplary embodiments of the present invention.

In FIG. 12, the degradation profile of four macromers at a set wt % MMA allowed the determination of the effect of molecular weight of the macromer on degradation rate. There are no considerable differences between the four networks at a set wt % MMA, thus wt % MMA is the determining factor in degradation. In FIG. 13, the degradation profile comprises one macromer at three different wt % MMA. As the wt % MMA increases, the degradation rate and degree of degradation over 12 weeks decreases. Thus the wt % MMA is a major component in controlling the rate of degradation for these networks.

Example 2

Polymeric Networks Comprising PEGDA, Hdda, 3 Mopa, and MMA

Figure 14:
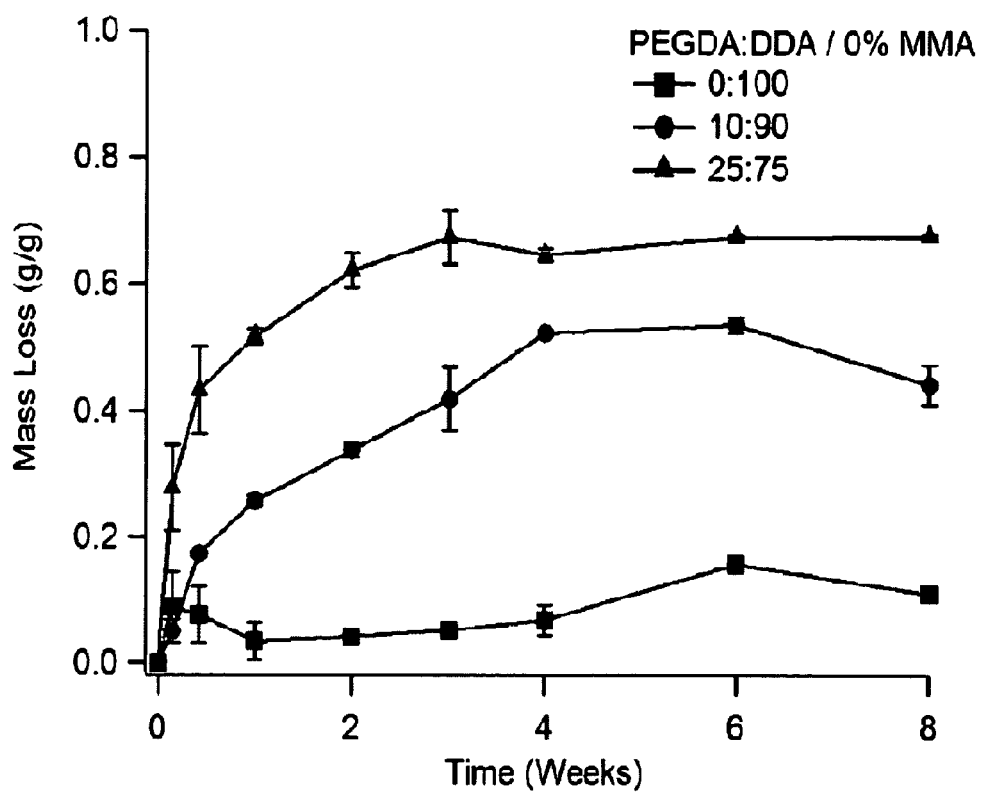
FIG. 14 graphically illustrates mass loss of polymeric networks having varying PEGDA to HDDA molar ratios, in accordance with exemplary embodiments of the present invention.
Figure 15:
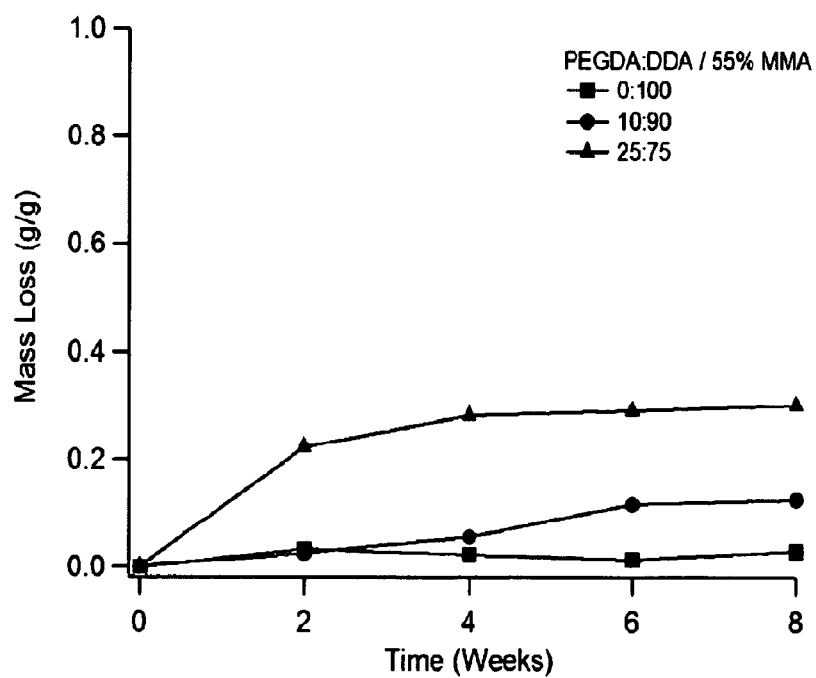
FIG. 15 graphically illustrates mass loss of polymeric networks of varying PEGDA to HDDA molar ratios, in accordance with exemplary embodiments of the present invention.

With the addition of PEGDA, $M_n \sim 700$, to HDDA during the step-growth polymerization reaction, a copolymer was formed. By varying the molar ratio of PEGDA:HDDA, the degradation rate and water uptake can be tuned. The tuning of the degradation rate is illustrated in FIG. 14. The addition of MMA allows for a suppression of the increased degradation rate, as illustrated in FIG. 15.

Figure 16:
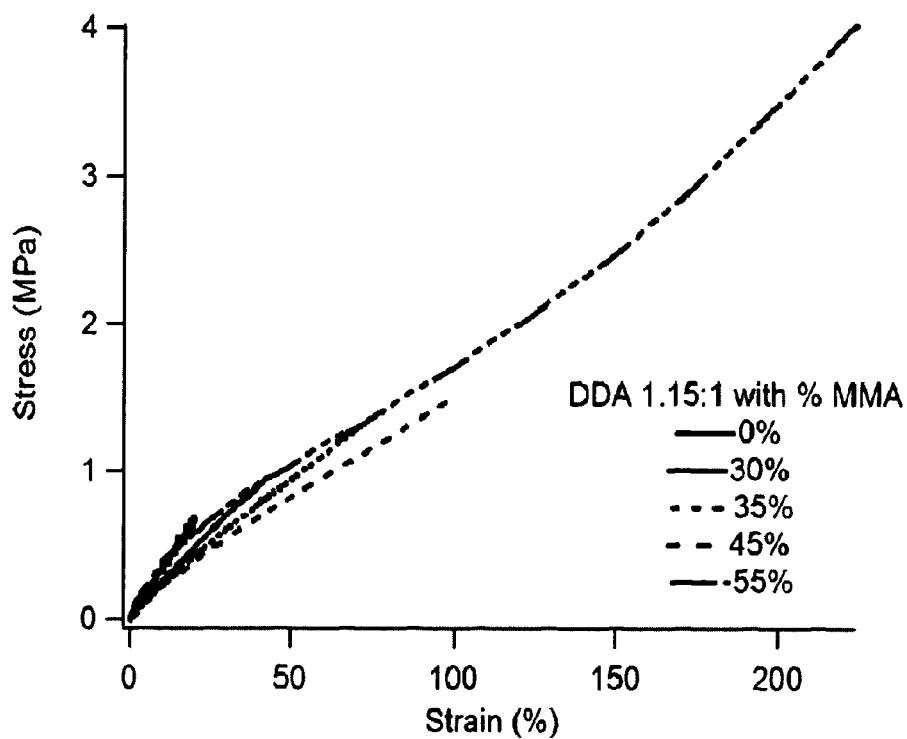
FIG. 16 graphically illustrates stress-strain curves of polymeric networks having varying MMA weight percents, in accordance with exemplary embodiments of the present invention.
Figure 17:
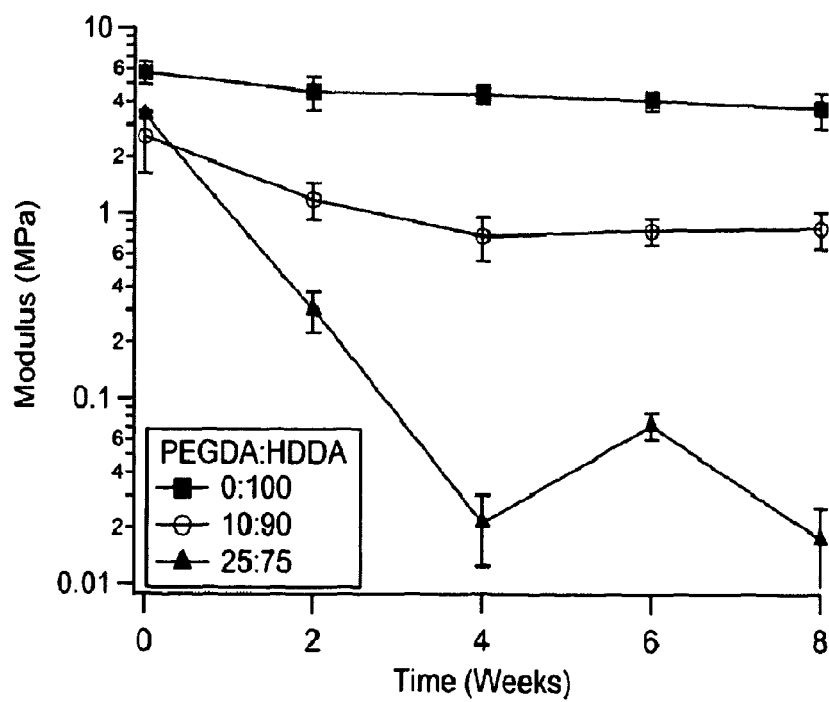
FIG. 17 graphically illustrates modulus of polymeric networks having varying PEGDA to HDDA molar ratios, in accordance with exemplary embodiments of the present invention.
Figure 18:
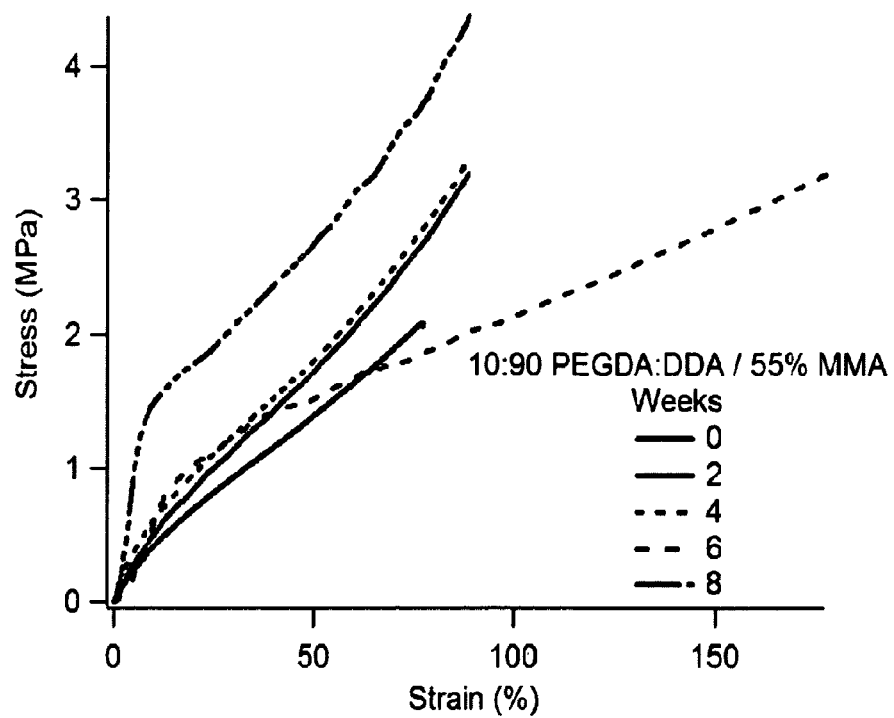
FIG. 18 graphically illustrates stress-strain curves of polymeric networks over varying periods of time, in accordance with exemplary embodiments of the present invention.
Figure 19:
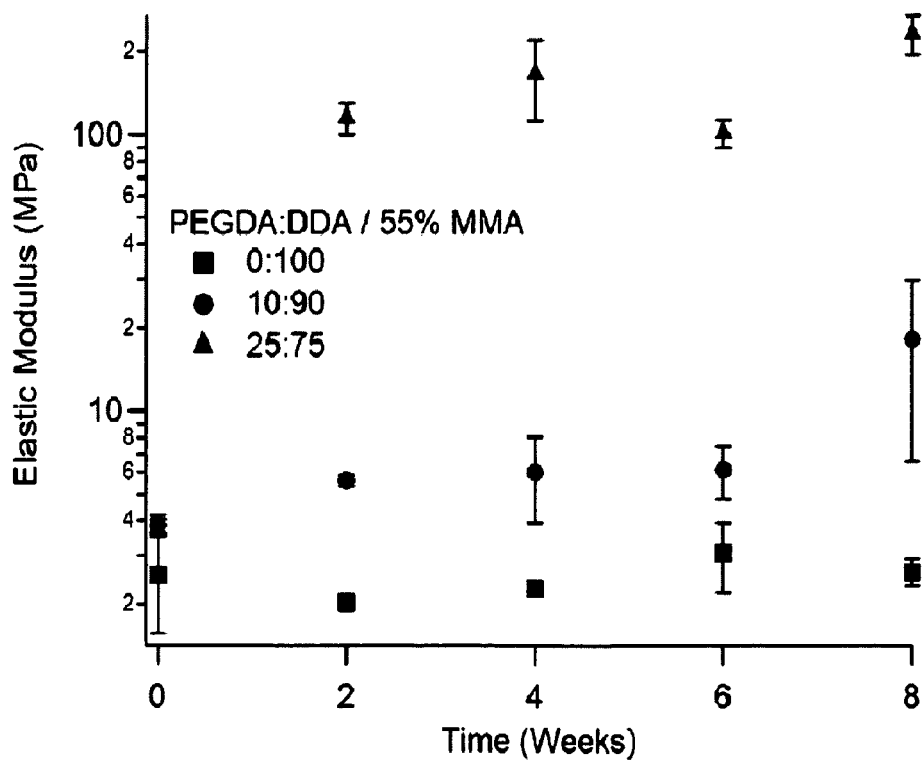
FIG. 19 graphically illustrates elastic modulus over time of polymeric networks having varying PEGDA to HDDA molar ratios, in accordance with exemplary embodiments of the present invention.
Figure 20:
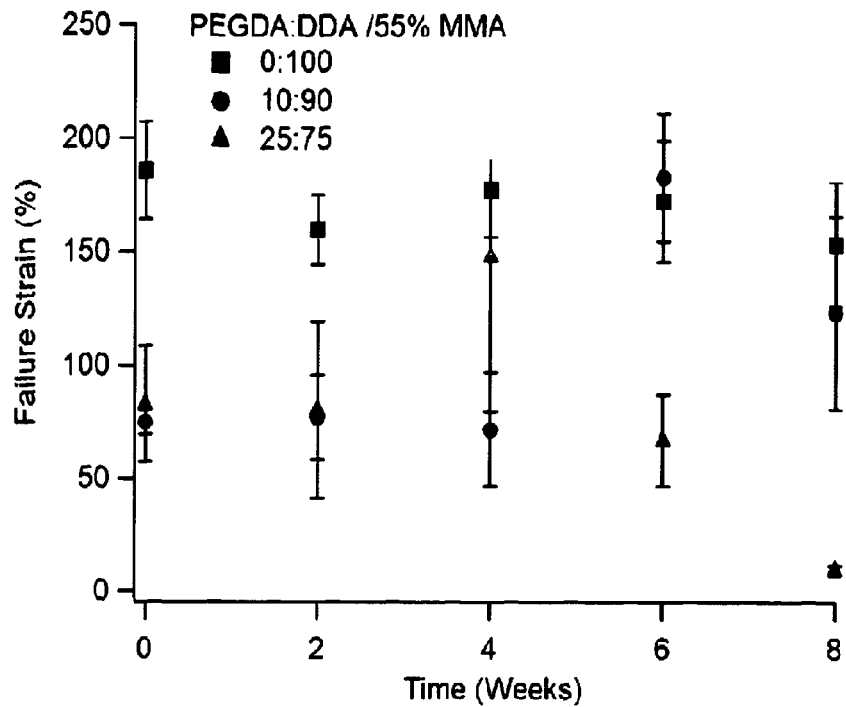
FIG. 20 graphically illustrates failure strain over time of polymeric networks having varying PEGDA to HDDA molar ratios, in accordance with exemplary embodiments of the present invention.
Figure 21:
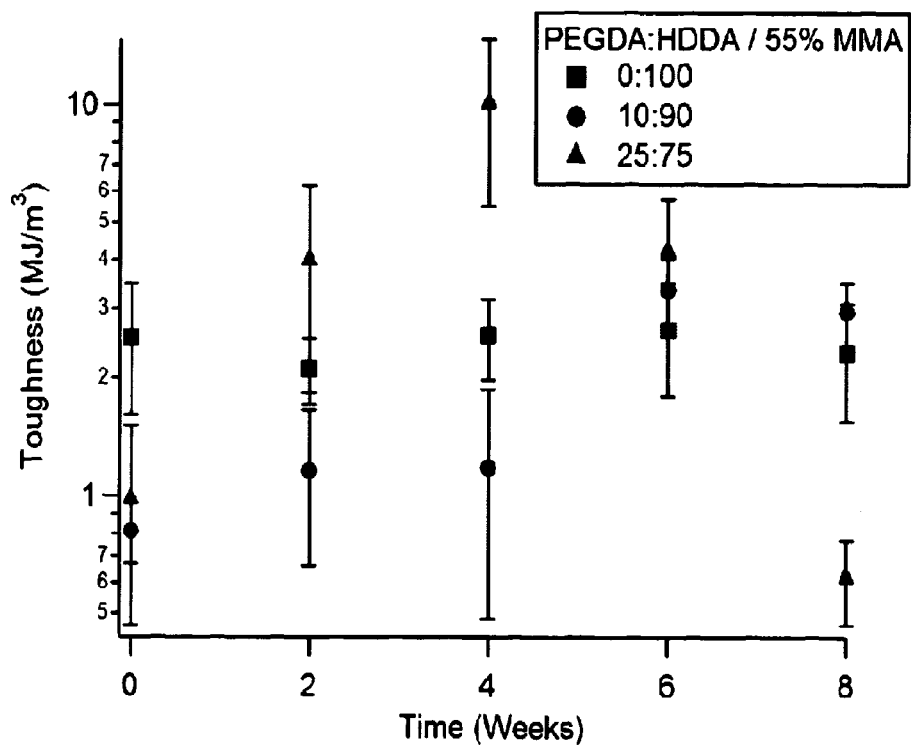
FIG. 21 graphically illustrates toughness over time of polymeric networks having varying PEGDA to HDDA molar ratios, in accordance with exemplary embodiments of the present invention.

Exemplary stress-strain curves of HDDA-MMA networks are shown in FIG. 16. The failure strain, strength, and toughness increases as MMA concentration is increased, as described above. It is expected that over time, the networks would degrade, and their mechanical properties would decrease, as seen in networks without MMA in FIG. 17. Tensile samples were degraded in saline at about 37° C. in an incubator for 8 weeks. Exemplary stress-strain curves are shown in FIG. 18. The strengthening is due to a relative shift in Tg. As time increases, the network degrades, losing its low Tg network structures. The remainder of the network has a higher relative Tg, thus showing the transition from a more rubbery material to a visco-elastic material. FIGS. 19-21 detail the mechanical properties as a function of time for DDA-PEGDA-MMA networks. As PEGDA concentration increases, the network degrades faster, and has a shift to a higher Tg and increased mechanical properties. Thus, the addition of PEGDA to the MMA network allows further tailorability of mechanical properties during degradation. This is significant because it demonstrates a polymer that self-toughens as it degrades.

Example 3

Effect of Chemical Structure and Crosslinking Density on the Thermo-mechanical Properties and Toughness of (Meth)Acrylate Shape Memory Polymer Networks Sixteen mono-functional (meth)acrylates were used as linear chain builders and 16 multi-functional (meth)acrylates were used as the crosslinkers to form the polymer networks. The names, abbreviations, chemical structures, and molecular weights can be found in Charts 1 and 2. A set of networks comprised of 10 mole percent (mol %) PEGDMA550 were copolymerized with each monofunctional acrylate from Chart 1. A set of networks comprised of 10 mol % of each crosslinker from Chart 2 were copolymerized with 90 mol % tBA. These sets were calculated using the molecular weights given in Charts 1 and 2. In addition, equivalent molar amounts of BMA, tBA, and EEM were copolymerized in varying degrees with PEGDMA550. The photoinitiator, 2,2-dimethoxy-2-phenylacetophenone, was added to each material in an amount of 0.5 wt %. Further equivalent molar amounts of BZA and EGPEM were copolymerized with PEGDMA550. All materials were purchased from Sigma Aldrich or Polysciences and used as received.

CHART 1

| Mono-functional Monomers | | |
|---|---|---|
| Monomer | Structure | Molecular weight (g/mol) |
| Methyl acrylate (MA) | 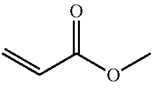 | 86.09 |
| Methyl methacrylate (MMA) | 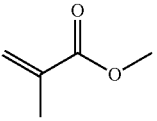 | 100.12 |

CHART 1-continued

Mono-functional Monomers

| Monomer | Structure | Molecular weight (g/mol) |
|---|---|---|
| Butyl acrylate(BA) | | 128.17 |
| tert-Butyl acrylate(tBA) | | 128.17 |
| tert-Butyl methacrylate(tBMA) | | 142.20 |
| 2-Ethoxyethyl methacrylate (EEM) | | 158.19 |
| Isobornyl methacrylate (IMA) | | 222.32 |
| 2-Ethylhexyl methacrylate (2EHM) | | 198.3 |
| Isodecyl acrylate (IA) | | 212.33 |
| Benzyl methacrylate (BMA) | | 176.21 |
| Ethylene glycol phenyl ether methacrylate (EGPEM) | | 206.24 |
| Poly(propylene glycol) acrylate (PPGA) | | 547 |
| Poly(ethylene glycol) phenyl ether acrylate $M_n$ 236 (PEGPEA236) | | 236 |

CHART 1-continued

| Mono-functional Monomers | | |
|---|---|---|
| Monomer | Structure | Molecular weight (g/mol) |
| Poly(ethylene glycol) phenyl ether acrylate $M_n$ 280 (PEGPEA280) | | 280 |
| Poly(ethylene glycol) phenyl ether acrylate $M_n$ 324 (PEGPEA324) | | 324 |
| Benzyl acrylate (BZA) | | 162.2 |

CHART 2

| Multi-functional Monomers | | |
|---|---|---|
| Monomer | Structure | Molecular Weight (g/mol) |
| Bisphenol A ethoxylate dimethacrylate $M_n$ 1700 (BPA1700) | | ~1700 |
| Bisphenol A ethoxylate dimethacrylate $M_n$ 540 (BPA540) | | ~540 |
| Bisphenol A ethoxylate diacrylate $M_n$ 688 (BPA688) | | ~688 |

CHART 2-continued

Multi-functional Monomers

| Monomer | Structure | Molecular Weight(g/mol) |
| --- | --- | --- |
| Bisphenol A ethoxylate diacrylate $M_n$ 512 (BPA512) | | ~512 |
| Bisphenol A ethoxylate diacrylate $M_n$ 468 (BPA468) | | ~468 |
| Neopentyl glycol propoxylate diacrylate (NGPDA) | | 328 |
| 1,6-Hexanediol diacrylate (HEXDA) | | 226 |
| Poly(ethylene glycol) dimethacrylate $M_n$ 550 (PEGDMA550) | | 550 |
| Pentaerythritol triacrylate (PETA) | | 298 |
| Trimethylolpropane ethoxylate triacrylate $M_n$ 428 (TETA428) | | ~428 |

CHART 2-continued

Multi-functional Monomers

| Monomer | Structure | Molecular Weight(g/mol) |
|---|---|---|
| Trimethylolpropane ethoxylate triacrylate $M_n$ 604 (TETA604) | | ~604 |
| Trimethylolpropane ethoxylate triacrylate $M_n$ 912 (TETA912) | | ~912 |
| Trimethylolpropane propoxylate triacrylate (TPTA) | | ~644 |
| Glycerol propoxylate triacrylate (GPTA) | | ~428 |
| Di(trimethylolpropane) tetraacrylate (DTTA) | | 466 |

CHART 2-continued

Multi-functional Monomers

| Monomer | Structure | Molecular Weight(g/mol) |
|---|---|---|
| Dipentaerythritol penta/hexaacrylate (DPPHA) | 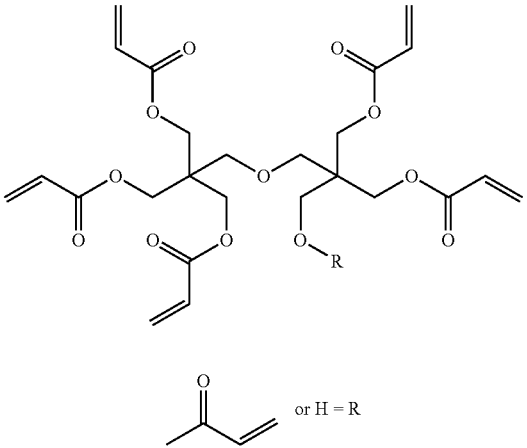 | 524 |

The polymer solutions were injected into a mold composed of two glass slides separated by 1 millimeter (mm) spacers. Glass slides were cleaned with Alconox then coated with Rain-X as a mold release agent. The injected molds were polymerized under a 365 nanometers (nm) UV lamp for an average of 20 minutes (min), while materials with low concentrations of crosslinker could take over 30 min.

Samples for dynamic mechanical analysis (DMA) were prepared by laser cutting specimens to 20 mm×5 mm×1 mm from bulk material. ATAQ800 was used in tensile loading with strain of 0.2%, preload of 0.001 N, force track of 150%, and frequency of 1 Hz. The samples were equilibrated at −50° C. for 2 min then raised to 200° C. at a rate of 5° C./min (n≥2). The glass transition temperature was defined as the peak of the tan d curve from the DMA testing.

Mechanical tensile testing was performed on dogbones of half size ASTM D638 type IV, which was laser cut from 1 mm thick samples. The testing apparatus was an MTS Insight 2 mechanical tester with a 100 N load cell. A thermal chamber (Thermcraft, Inc., model LBO-14-8-5.25-1X-J8249__1A) was used to isothermally test either at the glass transition temperature of each material or at another specified temperature. Once the chamber reached the set temperature, 10 min were given to insure equilibrium. A displacement rate of 1 mm/min was used, and the displacement was measured by the crosshead. Toughness was calculated by integrating the area under each stress-strain curve using the trapezoidal rule. The Kendall rank correlation coefficient was calculated to describe the relationship between select thermo-mechanical properties.

The characteristic ratios, C∞, from Table 1 were calculated using the method according to Wu by the following equation:

$$C_\infty = (1/\phi_0)^{2/3}[(\Sigma K_i + Bn_r)/M_r]^{4/3}(M_v/\langle l_v^2 \rangle).$$

$[(\Sigma K_i + Bn_r)/M_r]^{4/3}$ takes into account the intrinsic viscosity of the chain, where PKi sums the molar stiffness of each group. The molar stiffness constants for each group such as acrylic group or phenyl rings are detailed in the source. B takes into account the tacticity of the chain, for example, for poly(m-ethyl methacrylate) polymerized by free radical polymerization, B~4.12. The CED for five mono-functional (meth)acrylates was calculated using the group contribution method outlined by Van Krevelen. The molar volume ($V_g$) values used were for glassy amorphous polymers. The cohesive energy was calculated from the molar attraction values (F) using $CED=(F/V_g)^2$. Table 2 contains the calculated values. The monomers with aromatic sidegroups had higher CED values than the monomers with aliphatic side groups.

TABLE 1

Characteristic Ratios of Mono-functional Monomers

| Mono-Functional Monomer | C∞ |
|---|---|
| tBA | 9.47 |
| EEM | 11.98 |
| BZA | 12.97 |
| BMA | 13.67 |
| EGPEM | 16.19 |

TABLE 2

CED of Select Mono-functional Monomers.

| Monomer | CED (MPa) |
|---|---|
| BMA | 396 |
| BZA | 424 |
| EGPEM | 401 |
| EEM | 358 |
| tBA | 332 |

Materials were initially screened by creating a series of networks with either set multi-functional crosslinker or set monofunctional linear builder. The 16 networks in Table 3 were produced by polymerizing 10 mol % of PEGDMA550 and 90 mol % of each mono-functional monomer. The Tg and rubbery modulus ($E_r$) were measured through DMA and showed a medium strength positive correlation. The Tg of the networks ranged from −29 to 112° C., and the $E_r$ ranged from 2.75 to 17.5 MPa. Generally, the Tg increased as the pendant length decreased or by the addition of an α-methyl group. The 16 networks in Table 4 were produced from 90 mol % tBA and 10 mol % of each crosslinker. The Tg and the $E_r$ showed a medium strength positive correlation. The Tg ranged from −2 to 98° C., and the $E_r$ ranged from 6.48 to 129.5 MPa. As the functionality of the crosslinker increased, the $E_r$ increased for equivalent mole fraction of crosslinking molecule. The increase in rubbery modulus is driven by the relative increase in mole fraction of crosslinking "bonds" for a crosslinker with higher functionality.

TABLE 3

Thermo-Mechanical Properties of Networks composed of 10 mol % PEGDMA550 with 90 mol % Mono-functional (meth)acrylate.

| Mono-functional (meth)acrylate | $T_g$ (° C.) | $E_r$ (MPa) |
|---|---|---|
| MMA | 91.3 | 17.5 |
| MA | 23.5 | 11.75 |
| BA | −15 | 7.3 |
| tBA | 40.5 | 10.7 |
| tBMA | 89.5 | 8.9 |
| EEM | 19.5 | 11.25 |
| IMA | 112 | 6.45 |
| 2EHM | 20.5 | 7.7 |
| BZA | 23 | 10.51 |
| IA | −23.5 | 6.5 |
| BMA | 68 | 9.4 |
| EGPEM | 40.5 | 12.75 |
| PPGA | −29 | 2.75 |
| PEGPEA236 | 10.5 | 6.1 |
| PEGPEA280 | −3.5 | 6.05 |
| PEGPEA324 | −9.5 | 4.45 |

Figure 22:
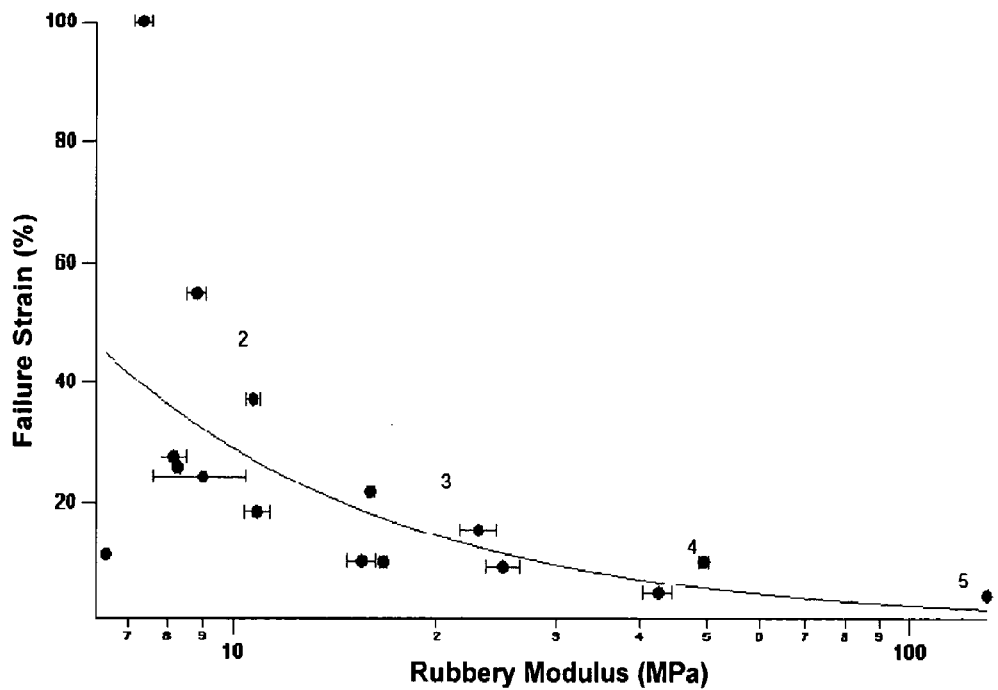
FIG. 22 graphically illustrates failure strain as a function of rubbery modulus of polymeric networks, in accordance with exemplary embodiments of the present invention.

The 16 networks from Table 4 were tensile tested until failure to characterize their large strain mechanical properties including failure strain and toughness. The failure strain of each network is plotted against its corresponding $E_r$ from DMA in FIG. 22. The failure strain ranged from less than 10% to over a 100%. The numbers 2-5 in FIG. 22 highlight the functionality of the crosslinkers. As expected, as the $E_r$ of the network decreases the failure strain increases. For most crosslinkers, as the functionality of the crosslinker decreases, the rubbery modulus decreases, and the failure strain increases. Consistent with previous results, a significant effect of the crosslinker chemistry was not observed aside from property values governed by a change in crosslinking effectiveness measured through rubbery modulus.

TABLE 4

Thermo-mechanical Properties of Networks composed of 90 mol % tBA and 10 mol % Multi-functional (meth)acrylate.

| Multi-functional (meth)acrylate | $T_g$ (° C.) | $E_r$ (MPa) |
|---|---|---|
| BPA1700 | −2.75 | 7.35 |
| BPA540 | 70.5 | 8.15 |
| BPA688 | 43.5 | 8.25 |
| BPA512 | 64.5 | 9.0 |
| BPA468 | 59.5 | 8.8 |
| NGPDA | 62.5 | 6.48 |
| HEXDA | 68.5 | 10.85 |
| PEGDMA550 | 40.5 | 10.7 |
| PETA | 98 | 42.5 |
| TETA428 | 83 | 25 |
| TETA604 | 55 | 16.65 |
| TETA912 | 24.5 | 15.95 |
| TPTA | 58 | 23 |
| GPTA | 69.5 | 15.5 |
| DTTA | 92 | 49.5 |
| DPPHA | 74 | 129.5 |

Figure 23:
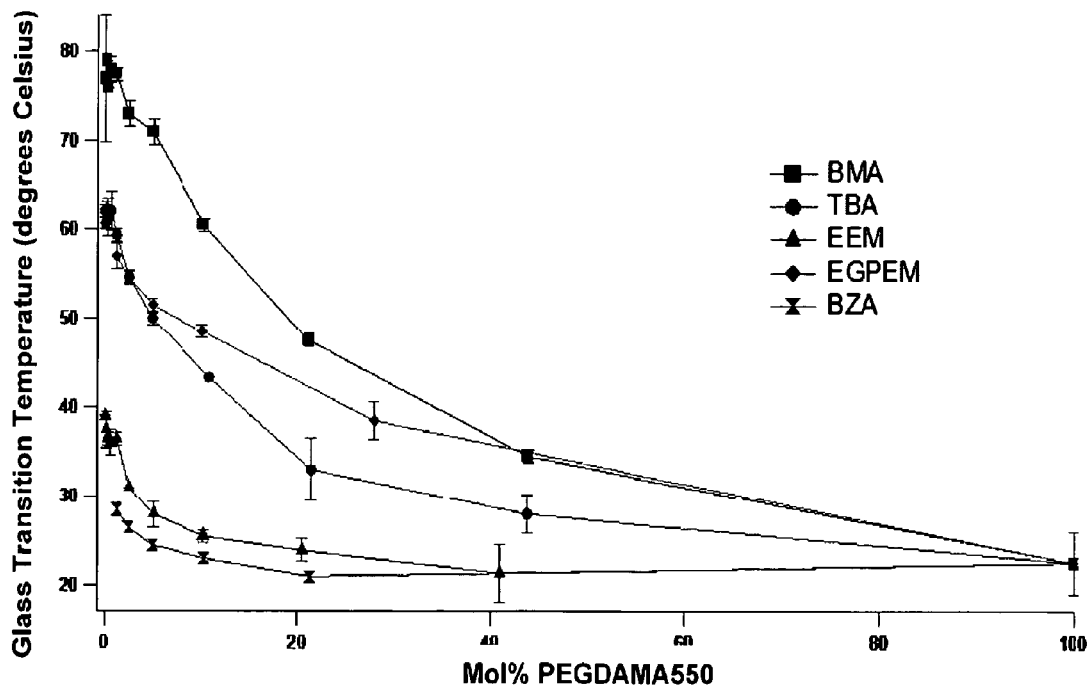
FIG. 23 graphically illustrates glass transition temperature of polymeric networks, in accordance with exemplary embodiments of the present invention.
Figure 24:
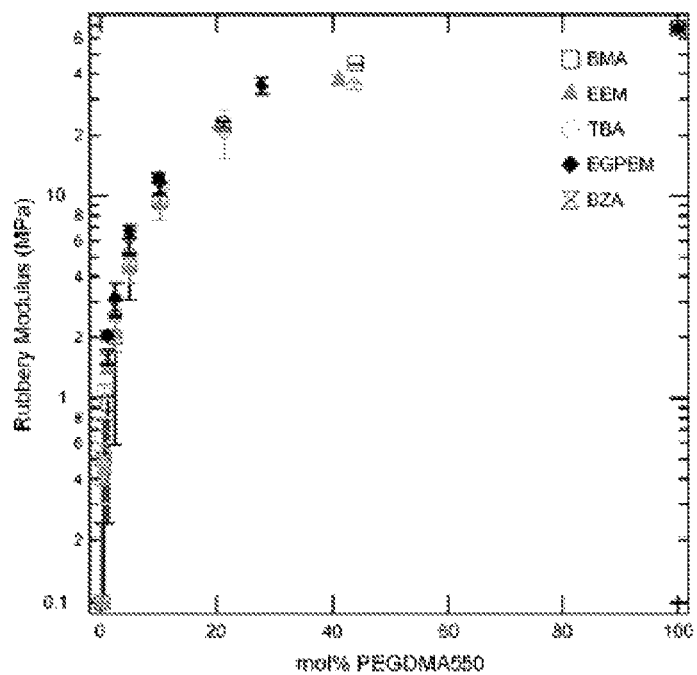
FIG. 24 graphically illustrates rubbery modulus of polymeric networks, in accordance with exemplary embodiments of the present invention.

Five linear (meth)acrylates were selected based on their differences in chemical structure and initial thermo-mechanical testing data. As the crosslinker concentration was decreased, the $E_r$ decreased. As the concentration of crosslinker approaches zero, the $E_r$ plateau disappears and $E_r$ steadily decreases with increasing temperature. The Tg of each network increased as the concentration of crosslink $E_r$ decreased. A non-linear trend is observed in FIG. 23. FIG. 24 displays the trend of the decreasing $E_r$ as the crosslinker concentration decreased for the five systems. Systems start at the same point since each was originally composed of 100% PEGDMA550. Systems approach 0 MPa as the crosslinker concentration approaches 0%. The results in FIGS. 23 and 24 demonstrate one of the known advantages of commercially available (meth)acrylate systems; using combination of various linear monomers and crosslinkers, one can independently tailor glass transition temperature and rubbery modulus. It is important to note that the PEGDMA550 crosslinker has equivalent impact on the five selected mono-functional monomers in terms of crosslinking effectiveness measured through rubbery modulus.

The networks were tensile tested to large strains to understand the effect of structure on the large strain behavior of the networks. The failure strain of each composition from the tensile test was plotted against its respective $E_r$ from DMA in FIG. 25. The results were plotted against $E_r$ to eliminate any differences that may be a result of different "effective" crosslink density in the networks and thus isolate the effects of the linear monomer chemistry as a function of increasing crosslinker concentration. In addition, all tests in FIG. 25 were conducted at the Tg of the respective polymer (which differed significantly, vis-à-vis FIG. 23) to assure all networks were in an equivalent state of macromolecular motion. At $E_r$ greater than 10 MPa (high crosslink density) the five systems had comparable failure strains for all compositions. At $E_r$ lower than 10 MPa the network failure strains diverged significantly. As the $E_r$ further decreased below 1 MPa, the networks did not display reliable rubbery plateaus, thus the data were excluded. The correlation coefficients between failure strain and $E_r$ reveal the high inverse correlation between failure strain and $E_r$.

Figure 25:
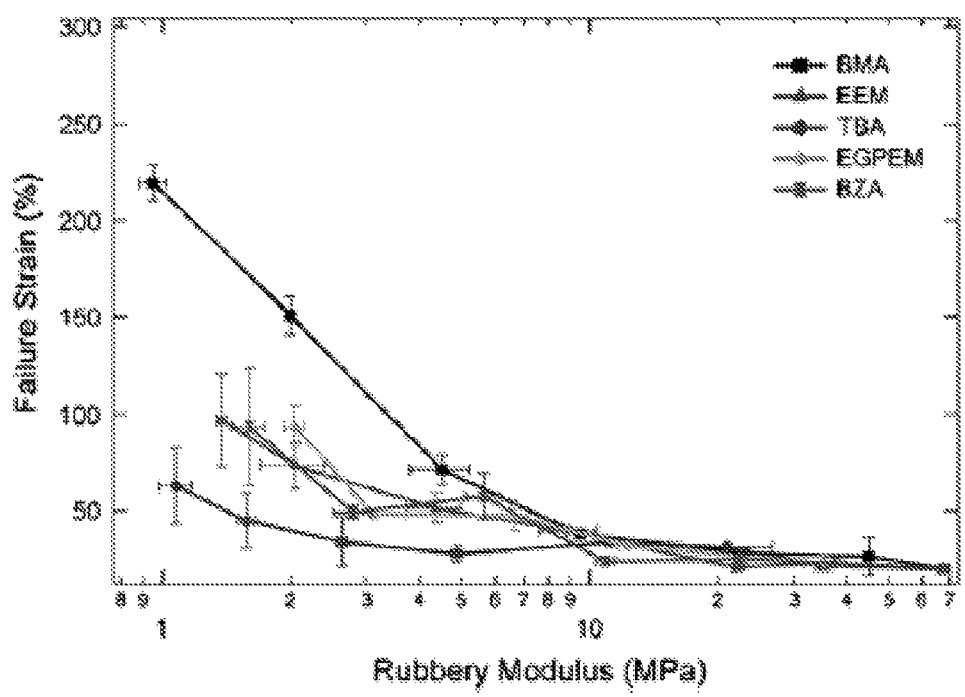
FIG. 25 graphically illustrates failure strain as a function of rubbery modulus of polymeric networks, in accordance with exemplary embodiments of the present invention.
Figure 26:
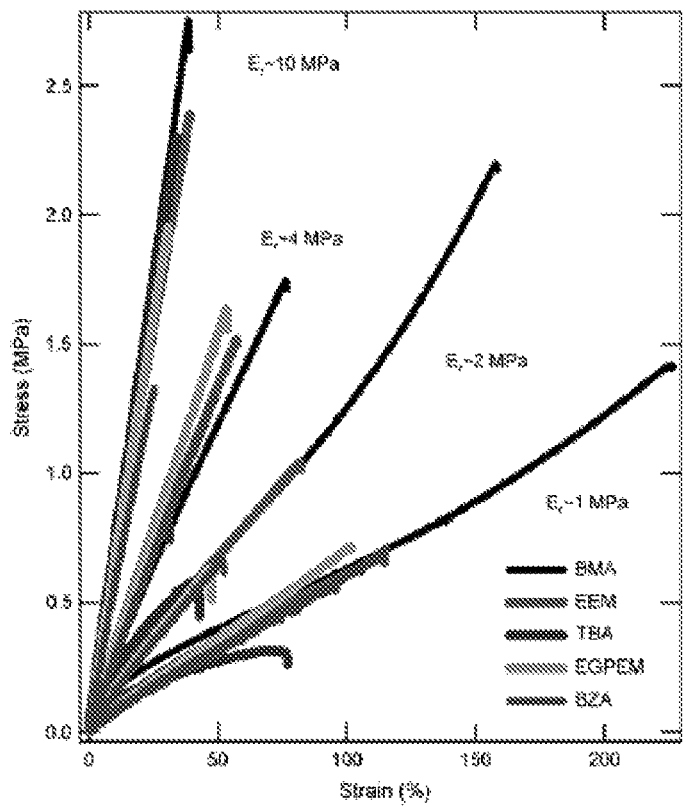
FIG. 26 graphically illustrates stress-strain curves of polymeric networks, in accordance with exemplary embodiments of the present invention.

To further support the results, FIGS. 25 and 26 display representative stress-strain curves of the five systems with increasing rubbery moduli. For all five materials, as $E_r$ decreases, the failure strain increases. The tBA, EEM, BZA, and EGPEM also show a decrease in strength as $E_r$ decreases. Unlike the other systems, the BMA system does not show a steady decrease in strength as $E_r$ decreases. The BMA has relatively higher failure strains and failure strengths as compared to the other materials at roughly equivalent rubbery modulus.

Figure 27:
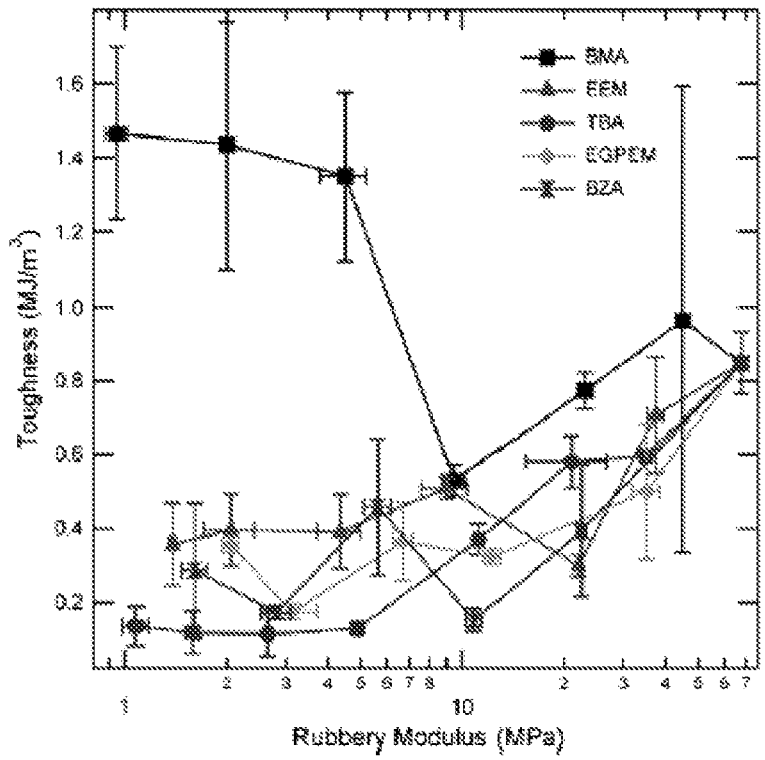
FIG. 27 graphically illustrates toughness as a function of rubbery modulus of polymeric networks, in accordance with exemplary embodiments of the present invention.

FIG. 27 displays the toughness, calculated as the area under stress-strain curves of the systems, as a function of the $E_r$. The systems have similar toughness at relatively higher $E_r$ values, and the systems diverge at $E_r$ values below 10 MPa. The tBA, EEM, BZA, and EGPEM systems have toughness values nearly a third of BMA. The point of divergence, the shape of the BMA stress-strain curves, and the increased toughness are points of interest to be further studied.

Figure 28:
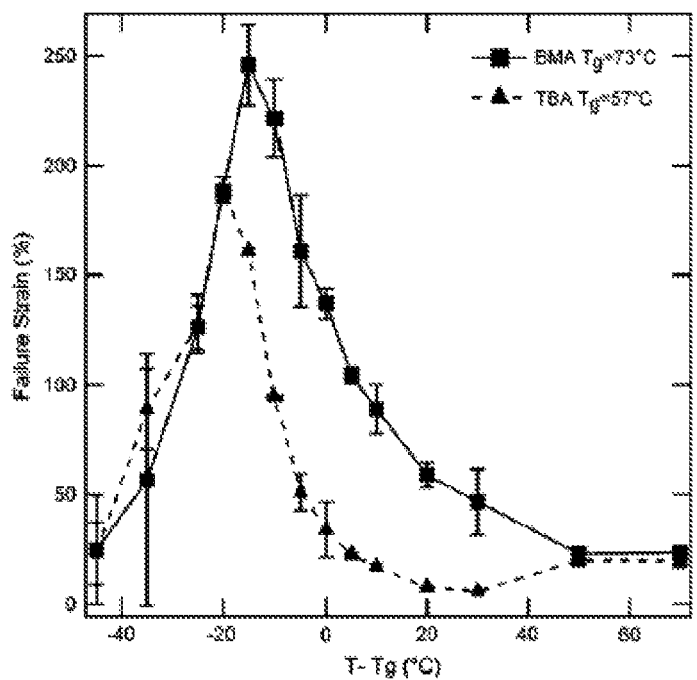
FIG. 28 graphically illustrates failure strain as a function of glass transition temperature of polymeric networks, in accordance with exemplary embodiments of the present invention.

Networks composed of 2.5 mol % PEGDMA550-co-BMA or PEGDMA550-co-tBA were tensile tested across a range of temperatures, represented in FIG. 28. The objective of this testing was to verify that the relatively high toughness of the BMA material compared to tBA was not merely an artifact of a relative test temperature difference even though both materials were tested at their Tg defined as the peak in tan d. The strain to failure in FIG. 28 is plotted at temperatures relative to each composition's respective Tg, T-Tg. A peak in failure strain is seen 15-20° C. before the Tg, then the curves level off when well into their respective rubbery region. The PEGDMA550-BMA curve reaches a higher peak and is broader than the PEGDMA550-tBA curve, highlighting the inherent toughness difference in the two materials that is not driven by a difference in effective crosslink density (measured through rubbery modulus) or temperature relative to Tg.

Figure 29:
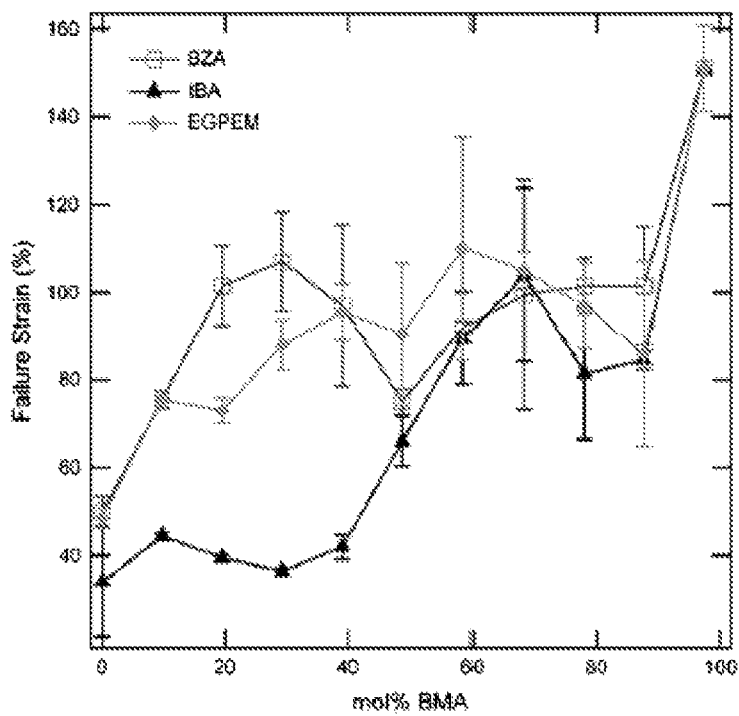
FIG. 29 graphically illustrates failure strain of polymeric networks, in accordance with exemplary embodiments of the present invention.
Figure 30:
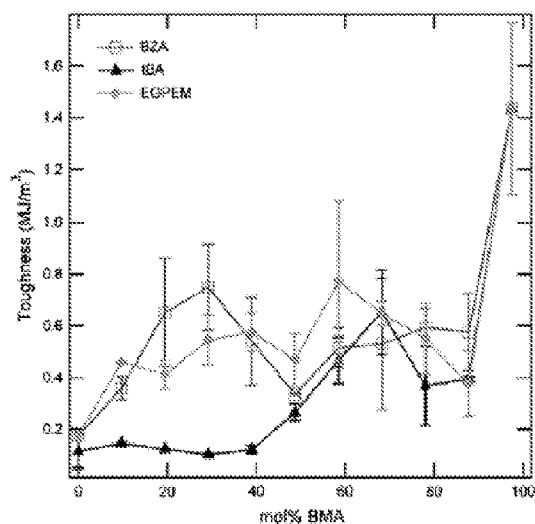
FIG. 30 graphically illustrates toughness of polymeric networks, in accordance with exemplary embodiments of the present invention.

Mixtures of the various linear monomers were created with equivalent crosslinker concentration to determine how mechanical properties evolved from one network to another. FIG. 29 shows the failure strain as a function of mol % BMA in three other linear monomers (all materials contain 2.5 mol % crosslinker). As the concentration of BMA increases, the failure strain increases. This trend is also seen in FIG. 30, which describes the effect of increasing the concentration of BMA on the toughness of the networks.

Polymer networks based on (meth)acrylate monomers have potential for a broad range of thermo-mechanical properties, making them strong candidates for shape memory materials. In order to understand the role of various components of these networks, mono-functional and multi-functional (meth)acrylates were used to synthesize a diverse set of polymer networks. Structure-property relationships were determined in these networks by studying their thermo-mechanical transitions and stress-strain response for systematically varied monomer functionalities, concentrations, and chemistries.

By holding crosslinker concentration constant, the effect of the mono-functional (meth)acrylate structure on the networks properties was determined. Chain backbone stiffness (capacity for conformational motion) and cohesive energy between chains are the primary drivers for Tg, but crosslinking and other factors also participate. The mono-functional (meth) acrylates with long sidegroups had the lowest Tg as may be expected based on the reduction of steric hindrance to conformational motion from the methylene and ester groups. As the sidegroup length decreased and α-methyl side groups were added, the Tg increased due primarily to local steric hindrance of segmental conformational motion and increased cohesive energy between chains. The effects are clear when combining the structures in Chart 1 with the Tg data from Table 3. Since these (meth)acrylates all have the same backbone, the sidegroup structure determines the Tg, and similar results in epoxies have demonstrated that the chemical structure of the amine alters Tg. In summary, the combination of both α-methyl groups and short, rigid pendant groups on each side of the chain's backbone increases the Tg as can be seen in MMA and IMA.

In order to understand the effect of the crosslinker functionality on the networks, the mono-functional acrylate, tBA, was held constant and polymerized with various crosslinkers. The most identifiable trend was the relationship between the crosslinkers' functionality and Er. It is known that as the crosslinkers' functionality increases, the network crosslink density increases, thus increasing Er. This trend is clear in FIG. 22, where the failure strain is plotted against the Er. Driven by different crosslinking effectiveness, the 16 networks trade-off failure strain and rubbery modulus. The majority of the networks with low Er had higher failure strains than the high Er networks. The materials with high Er due to higher functionality were relatively brittle due to high crosslink density.

The above results highlight the capacity to readily adjust thermo-mechanical properties, a capacity that is central to an effective shape memory polymer. Aside from basic thermo-echanical properties, it is important for some shape memory applications, and for deeper fundamental understanding, to examine large strain behavior of the networks. Prior work has examined the effect of varying crosslinker length and concentration on the large strain behavior of acrylate networks. Here we focus on the reciprocal problem of varying mono-functional monomer for the same crosslinker added in varying concentrations. Five mono-functional monomers were chosen for differences in their transition temperatures, chemical structure, $C\infty$ and CED values.

In order to determine an appropriate testing temperature and provide a rough measure of effective crosslink density, Tg and $E_r$ were measured for all five materials across all crosslink densities. As expected, the $E_r$ decreases as the concentration of the crosslinker decreases in all networks. Since the selected crosslinker (PEGDMA550) has a relatively low Tg value when homopolymerized, the addition of it to all linear monomers serves to reduce Tg while increasing rubbery modulus. At 1 mol % crosslinker, the networks had reached their final Tg, thus further characterization was not continued for the BZA and EGPEM systems. Also, below a 1 mol % crosslinker concentration, the networks start to effectively transition to a thermoplastic, which is indicated by a loss of a rubbery modulus plateau. The breadth of the transition from the glassy to rubbery state decreases as the concentration of crosslinker decreases, as is expected because highly crosslinked systems have increased heterogeneity. The results here are consistent with previous studies where concentration of crosslinker was varied in acrylates.

The baseline thermo-mechanical experiments were necessary to assure that the selected test temperature is in the same proximity of an individual composition's Tg and maintain equivalent states of molecular motion during large strain testing. A key finding of the tensile test was the existence of a divergence point, seen in FIG. 25 at a rubbery modulus of 10 MPa. Above 10 MPa, the crosslinking dominates the large strain mechanical properties of the network and a relatively brittle response is observed. It is important to note that although the mono-functional monomer has minimal impact on mechanical properties at these high crosslink densities, the mono-functional monomer choice will influence Tg of the network and consequently impact mechanical properties at a constant testing temperature. As $E_r$ is decreased below 10 MPa, the large strain mechanical properties of the networks diverge and the capacity for strain and toughness depends on the choice of mono-functional monomer. Soon after entering the regime of mono-functional monomer sensitivity, the Tg of each network has reached close to a steady state value and thus there is no correlation between the absolute Tg of the network and the failure strain. This is evident in tBA and EGPEM having similar Tg's at low mol % PEGDMA550, but different failure strains at similar concentrations of PEGDMA550.

The stress-strain curves at representative rubbery moduli values were examined to understand the divergence of the failure strain. In general, the networks transition from brittle to ductile behavior as the Er decreased is seen in FIG. 26. An inherent trade-off between strength and failure strain is evident in most networks with exception to the BMA network, which reached a high enough strain to exhibit non-linear strain-hardening even at reasonably high crosslink densities. This can be attributed to the reorientation of chains in the tensile direction. As Er decreases it becomes increasingly important to consider structural parameters of the mono-functional monomers. The strain to failure results do not correlate inversely with $C\infty$ values for the crosslinked networks as is common for thermoplastics. For example the $C\infty$ value for tBA is significantly lower than $C\infty$ for BMA although the latter has significantly higher failure strain at equivalent rubbery modulus. This observation implies that the capacity for network backbone chains to coil, as measured by $C\infty$, is incapable of predicting failure strain and toughness properties once these chains are moderately crosslinked. It seems that factors that toughen thermoplastics, such as coilability and high entanglement density are rendered less effective due to chemical crosslinking. On the other hand, the CED may be used for relative comparison to determine if a material will strain farther through enhanced network toughness, as seen by combining Table 2 and FIG. 25. These results indicated that higher cohesive energy between chains, for equivalent crosslink density, serves to toughen the materials through increased resistance to fracture during large strain deformation. In other words, it appears that in the presence of moderate chemical crosslinking, strain to failure can be enhanced through improved toughness by increasing CED between chains.

Toughness was explicitly evaluated because of its importance during processing of shape memory polymers. Similar to failure strain, toughness diverges at 10 MPa, as seen in FIG. 27. Due to the strain-hardening that is observable in the stress strain behavior, BMA has the highest toughness below the divergence point while the other linear monomers have the same lower amount of toughness. The parameter C∞ also breaks down when examining network toughness. For example, from Table 1 and FIG. 27, BZA, EGPEM, and EEM have different calculated C∞, but exhibit similar levels of toughness.

In order to verify the inherently superior large strain mechanical properties of BMA networks, the test temperature should be eliminated as a factor influencing mechanical properties. To assure test temperature was not a factor in comparison of the networks, PEGDMA550-co-BMA and PEGDMA550-co-tBA, at the same mol % crosslinker (and the same rubbery modulus), were tested over a wide temperature range. These two materials were chosen because their failure strains and test temperatures differed by 100% and by more than 10° C., respectively. Considering a sweep of test temperatures, the PEGDMA550-co-BMA network has inherent capacity for more deformation as observed in FIG. 28. It is interesting to note that the enhanced toughness of the BMA network only occurs at temperatures in the range of Tg −10° C. to Tg +50° C. Thiol-ene/acrylate networks containing phenyl rings via Bisphenol A ethoxylate diacrylates have shown increased impact toughness near their Tg. In the extreme temperature limits (glassy or rubbery) the failure strain of both materials is low and comparable. This result indicates that the toughening mechanism has an inherent viscous component that operates on distinct time and temperature scales.

To ascertain the influence of varying amounts of mono-functional monomers on mechanical properties, binary mixtures of mono-functional monomers with constant crosslinker concentration were formulated. With the BMA network as an upper bound of properties, the failure strain and toughness rise as BMA concentration increases, seen in FIGS. 29 and 30. The BMA-BZA and BMA-EGPEM mixtures have higher failure strains and toughness values than the BMA-tBA mixtures, which may be due to the higher and more similar CED values of the monomers containing phenyl rings. The mechanical properties converge as the mol % BMA increases, near 70 mol % BMA. The properties of the BMA-BZA mixtures increase as the concentration of the α-methyl group increases, suggesting that the increased steric hindrance from the α-methyl group affects the mechanical properties. Likewise, the properties of the BMA-EGPEM mixtures increase as the phenyl ring is moved closer to the backbone by the subtraction of flexible ethylene glycol groups. Given these two trends, the transition from tBA to BMA is significant because both α-methyl and phenyl ring groups are being added to the network with increased BMA concentration. tBA lacks substantial deformation capacity because the failure strain and toughness do not increase until the majority of the network is BMA.

A method to theoretically predict (meth)acrylate network properties based upon the chemistry and structure has yet to be established. From this study, properties such as failure strain, toughness, Tg, and $E_r$ can be tailored by varying the components of the network. The macromolecular parameter C∞ is incapable of predicting failure strain and toughness in moderately crosslinked networks while CED can be used with some success in (meth)acrylate networks. New predictive parameters need to be developed or previous ones augmented to take into account key characteristics of network structure. In particular, the viscoelastic region is of great importance because shape memory polymers rely on approaching their Tg for actuation. In this region, both the monomer and network structure play a role in the large strain properties of the material as was demonstrated here.

Example 4

The Effect of Chemistry on the Polymerization, Thermo-mechanical Properties and Degradation Rate of Poly(β-amino Ester) Networks PEGDA of four varying molecular weights, $M_n$ 258, 302, 575, 700, was used as one diacrylate system. The other diacrylate system, diol diacrylates (DDA), comprised 1,4-butanediol diacrylate (DDA198) (Dajac Labs), 1,6-hexanediol diacrylate (DDA226), 1,9-nonanediol diacrylate (DDA268) (TCI). The primary amine was 3MOPA. 2-hydroxy-1-[4-(hydroxyethoxy)phenyl]-2-methyl-1-propanone (Irgacure 2959) was used as the photoinitiator. All chemicals were used as received from Sigma Aldrich unless otherwise noted.

Each of the seven diacrylates was mixed with 3MOPA at molar ratios from 1.05:1 to 1.25:1 at increments of 0.05. The step-growth polymerization occurred for 24 hours (h) at 200 rotations per minute (rpm) at 90° C. on a JKEM reaction block (RBC-20 with BTS-1500 shaker) to form the macromers. The resulting macromers were either stored at 4° C. or mixed with 0.5 weight percent (wt. %) Irgacure 2959 for photopolymerization. The macromers were placed into a 5 centimeters (cm)×6 cm×0.1 cm teflon mold, sealed with glass slides, and polymerized for 10 min by a UVP Blakray lamp (e8 mW/cm2) to form chemically crosslinked networks. Due to the inherent heterogeneity, the materials were synthesized and all tested in triplicate, where mean±SD is reported.

Dynamic mechanical analysis (DMA) of each network was performed via a TA Instruments DMA Q800. Rectangular samples were run in tension under strain control of 0.1% according to the following protocol: equilibrate at −100° C., isotherm for 2 min, ramp 3° C. per minute to 100° C. The glass transition temperature (Tg) was defined at the peak of the tan d curve. The molecular weight between crosslinks was calculated from:

$$M_C = \frac{3\rho RT}{E}$$

where E is the modulus, r is the polymer density, R is the gas constant, T is the temperature in Kelvin, and $M_c$ is the molecular weight between crosslinks.

Select networks were analyzed with a TA Instruments DSC Q100. Samples were cooled at 3° C. per minute to −90° C., isotherm for 2 min, and then heated at 3° C. per minute to 100° C.

A VarianMercury Vx 400[1] HNMR was used to verify the structures of the macromers after step-growth polymerization in deuterated chloroform. The spectrum was analyzed via MestRe-C software to determine the number of hydrogen as well as an estimate of the diacrylate to amine ratio, and therefore the molecular weight.

A Nicolet Nexus 870 FTIR with attenuated total reflectance (ATR) module was used to characterize the step-growth and free-radical polymerization. Macromer samples were taken at 2, 4, 8, 16, and 24 hours from the reaction block and the acrylate peak at 812 cm$^{-1}$ was monitored. After 24 hours, the samples were mixed with 0.5 wt % Irgacure 2959 and polymerized with the UVP Blakray lamp. The data collection was taken in real time for at least 5 min to ascertain the degree of conversion to a network from the peak at 812 cm$^{-1}$.

A sol fraction test was employed to determine the extent of conversion in network formation. Tert-butyl benzene was used, where 1 square centimeters (cm$^2$) squares cut from 1 mm thick sheets were soaked for 48 hours with a change in solvent at 24 hours. The samples were dried in an oven with dessicant to remove all traces of solvent and then allowed to equilibrate with the surrounding atmosphere for 3 days. The sol fraction is defined through Equation:

$$SolFraction = 1 - \frac{M_f}{M_i}$$

where $M_f$ is the final mass and $M_i$ is the initial mass.

In order to determine the degradation rate and water content of each material, each material was soaked for varying amounts of time. Each material was cut from a 1 millimeter (mm) thick sheet into a 1 cm$^2$ and placed into a well plate with phosphate buffered saline (PBS), pH 7.4. The well plates remained in an incubator at 37° C. on a rotary shaker at 60 rpm. Samples were patted dry to remove excess water to obtain the wet sample mass. The samples were dried for 24 h and the mass taken. The water content of each material is defined by:

$$WaterContent = \frac{M_{wi}}{M_{di}} - 1$$

where $M_{wi}$ is the wet mass at time i and $M_{di}$ is the mass at time i after 24 hours of drying. The mass loss is defined by:

$$Massloss = 1 - \frac{M_{di}}{M_o}$$

where $M_{di}$ has been previously described and $M_o$ is the initial mass.

Figure 31:
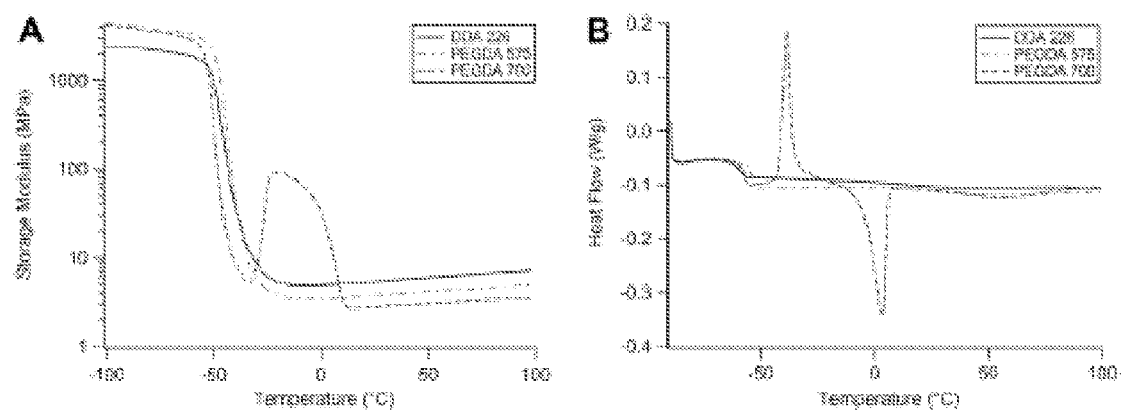
FIG. 31A-B graphically illustrates storage modulus and heat flow of polymeric networks, in accordance with exemplary embodiments of the present invention.

Representative DMA and DSC curves are shown in FIG. 31 for both PEGDA and DDA networks. The glass transition temperature (Tg) is well below room temperature for all these materials, and thus the material is rubbery at ambient temperatures. PEGDA700-based networks have a hump in the modulus above Tg, which signifies crystallization and subsequent melting due to the high molecular weight of the PEGDA chain. The crystallization and melting can be seen in the DSC curves in FIG. 31B for the PEGDA700-based network. The molecular weight of the PEGDA575-based network or the DDA226-based network is not high enough to promote crystallization, thus the lack of the hump in the DMA curves of FIG. 31A and the lack of crystallization and melting peaks in the DSC curves of FIG. 31B.

Networks formed from each diacrylate and 3MOPA at varying molar ratios were tested on the DMA. The modulus in the rubbery regime at a temperature of Tg+75° C. is given as a function of the molar ratio as shown in FIGS. 1A and B. In order to compare rubbery modulus between systems, the rubbery modulus was measured at the same relative temperature to Tg, Tg+75° C. The PEGDA302 does not form a network at molar ratio 1.05:1 due to a lack of acrylate bonds. The modulus ranged from 0.14 to 5.36 MPa for the PEGDA networks, and from 0.15 to 6.71 MPa for the DDA networks. The rubbery modulus increases as the molar ratio increases, as expected from a similar study. However, there is no obvious trend between the diacrylate molecular weight and the rubbery modulus. The Tg as a function of the molar ratio is shown in FIGS. 1C and D. The Tg ranged from −44.3° C. to −31° C. for the PEGDA networks, and from −50.9 to −35.6° C. for the DDA networks. The Tg increases as the molar ratio increases and as the diacrylate molecular weight decreases for the DDA networks, but the Tg increases only as the diacrylate molecular weight decreases for the PEGDA networks. The molecular weight between crosslinks for PEGDA-based and DDA-based networks for each molar ratio is shown in FIGS. 1E and F. The molecular weight between crosslinks ranged from 1500 to 115,000 grams per mole (g/mol) for the PEGDA-based networks and from 1200 to 59,000 g/mol for the DDA-based networks.

A series of structural analyses were performed to help understand the trends in modulus presented in FIG. 1. In order to understand the extent of conversion during step-growth polymerization, the acrylate bond was monitored via FTIR over 24 h. The molar ratio of 1.20:1 was examined for each diacrylate as shown in FIG. 32. In FIG. 32A, the PEGDA258 and PEGDA302 converted quicker and to a higher extent than the PEGDA575 and the PEGDA700 networks. In FIG. 32B, the degree and rate of conversion increased as the DDA molecular weight decreased. PEGDA and DDA macromers formed from monomers of similar molecular weight have quite different step-growth conversions, where PEGDA monomers converted faster and to a higher degree. Due to the diacrylate to amine ratio being greater than 1, all of the diacrylate endgroups will not be completely consumed. When using a molar ratio of 1.20:1 of diacrylate to amine and all of the amine endgroups react, there will be a theoretical diacrylate excess of 16.6%; thus, the expected amount of diacrylate endgroups consumed is 83.3%.

Figure 34:
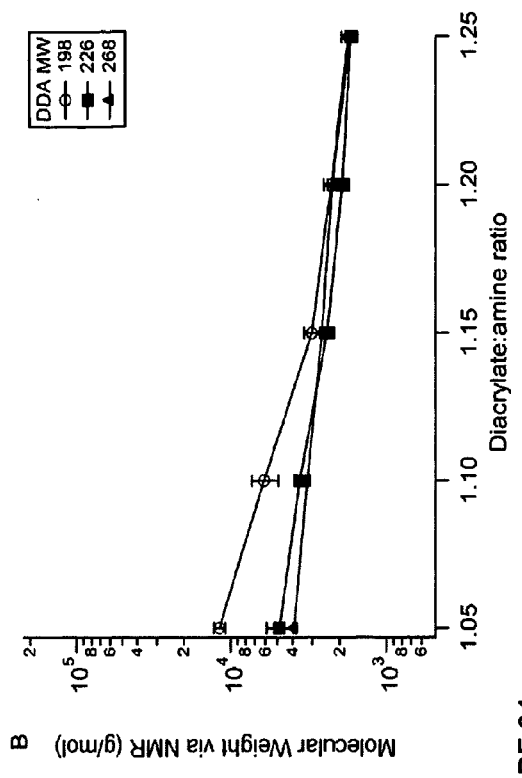
FIG. 34A-B graphically illustrates molecular weights of polymeric networks, in accordance with exemplary embodiments of the present invention.
Figure 34:
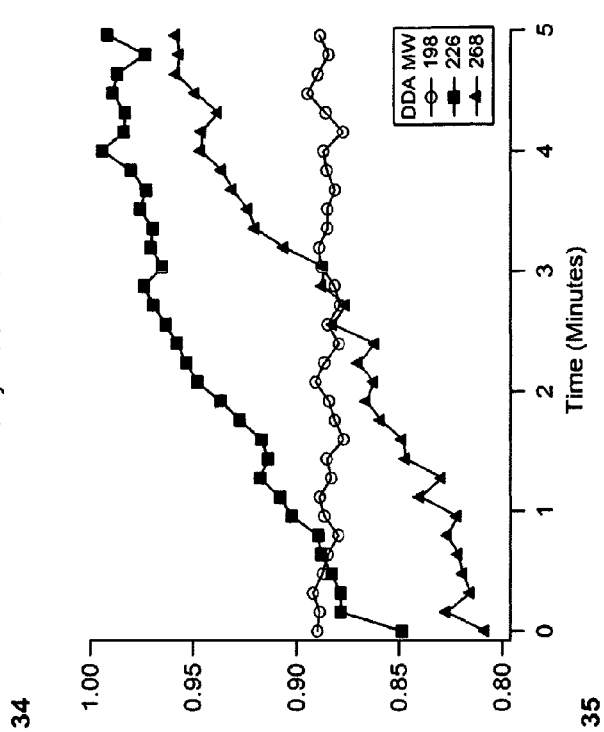

After 24 h of step-growth polymerization, NMR was used to verify the chemical structure of the macromers, especially the presence of acrylate endgroups, and the incorporation of the amine into the macromer as shown in FIG. 33 by an absence of a peak near 1 parts per million (ppm). From endgroup calculations, an estimation of macromer molecular weight can be determined. The average molecular weight of the macromers from NMR for each backbone chemistry and molar ratio is shown in FIG. 34. The average molecular weight of the macromers decreased as the molar ratio increased for both network chemistries. The macromer molecular weight ranged from 2200 to 37,400 g/mol for the PEGDA-based macromers, and the macromer molecular weight of the DDA-based macromers ranged from 1700 to 11,800 g/mol. The macromer molecular weight of the PEGDA-based macromers showed no direct relationship with diacrylate molecular weight, where the PEGDA575 and PEGDA258-based macromers had similar macromer molecular weights and the PEGDA700 and the PEGDA302-based macromers had similar macromer molecular weights.

The PEGDA258 and PEGDA302-based macromers did reach a higher conversion during stepgrowth, and therefore have higher macromer molecular weight. The macromer molecular weight of DDA-based macromers converged as the molar ratio increased.

Figure 35:
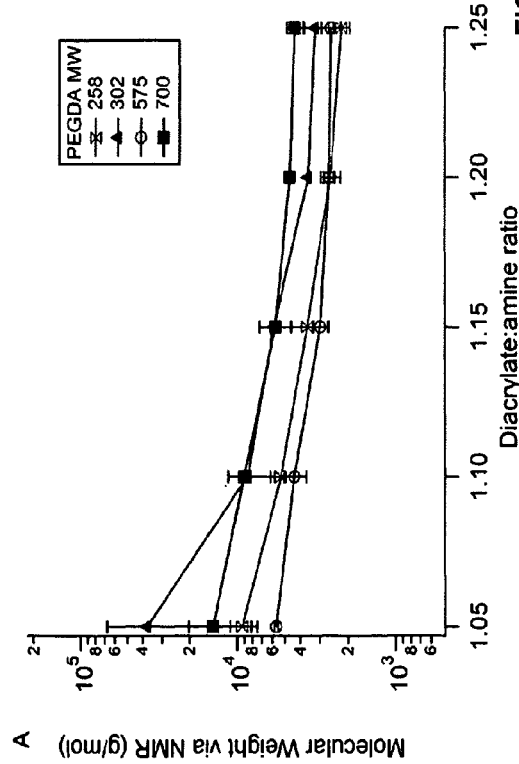
FIG. 35A-B graphically illustrates conversion of polymeric networks, in accordance with exemplary embodiments of the present invention.
Figure 35:
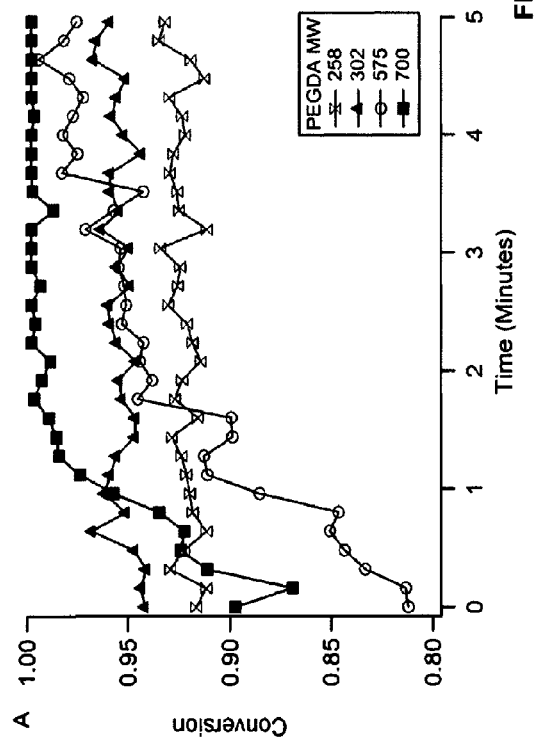
Figure 36:
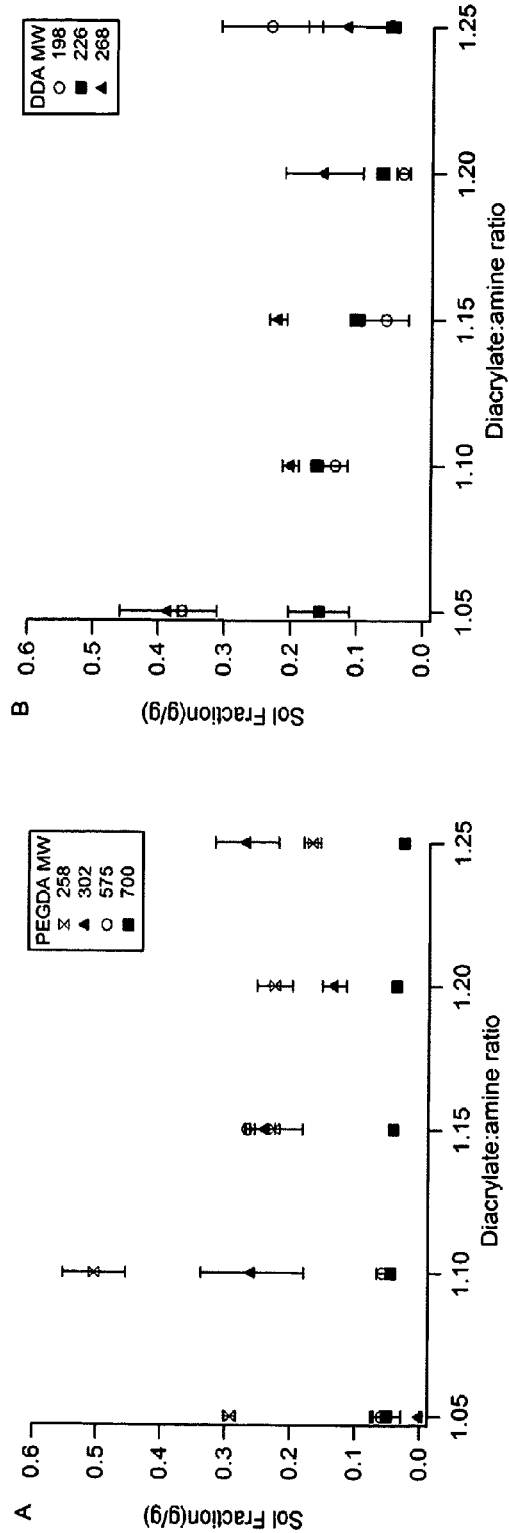
FIG. 36A-B graphically illustrates the sol fraction of polymeric networks, in accordance with exemplary embodiments of the present invention.

From the FTIR-ATR photopolymerization, the conversion of remaining acrylate bonds was monitored for networks at a molar ratio of 1.20:1. The conversion of PEGDA networks and DDA networks is shown in FIGS. 35A and B, respectively. PEGDA575 and PEGDA700 networks reached high degrees of conversion, while PEGDA258 and PEGDA302 did not. The DDA226 and DDA268 reached higher degrees of conversion than the DDA198 network. In essence, the networks formed from macromers that had high degrees of conversion during step-growth did not reach high degrees of conversion during photopolymerization. To compare the conversion measured from FTIR-ATR photopolymerization, sol fraction testing was conducted across all molar ratios and diacrylate monomer chemistries and molecular weights as shown in FIG. 36 PEGDA575 and PEGDA700 networks showed lower sol fractions, 0.03-0.06, respectively, compared to the PEGDA258 and PEGDA302 networks, 0.13-0.5, respectively. DDA networks showed similar levels of sol fraction to the PEGDA networks ranging from 0.04 to 0.38.

Figure 37:
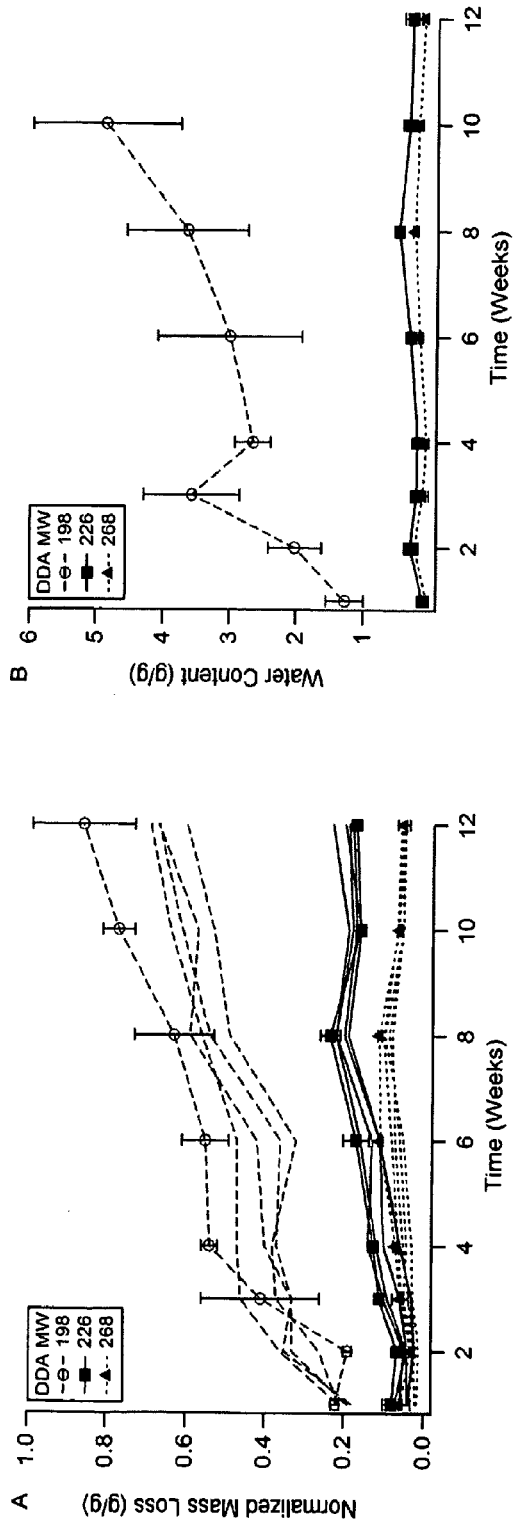
FIG. 37A-B graphically illustrates normalized mass loss and water content of polymeric networks, in accordance with exemplary embodiments of the present invention.

Degradation profiles for all diacrylate molecular weights and molar ratio of DDA are shown in FIG. 37A. The degradation rates of the DDA226 and DDA268 are tightly grouped, while the DDA198 is distinct from the other DDA networks. The marked curves are the lowest molar ratio, 1.05:1, for each DDA molecular weight. The water content of the DDA226 and DDA268 does not exceed 1, while the water content of the DDA198 is higher as shown in FIG. 37B. The networks with rapid degradation match the networks with high water content. In the DDA system degradation rate is strongly influenced by molecular weight but not by ratio for this range of molecular weights.

Figure 38:
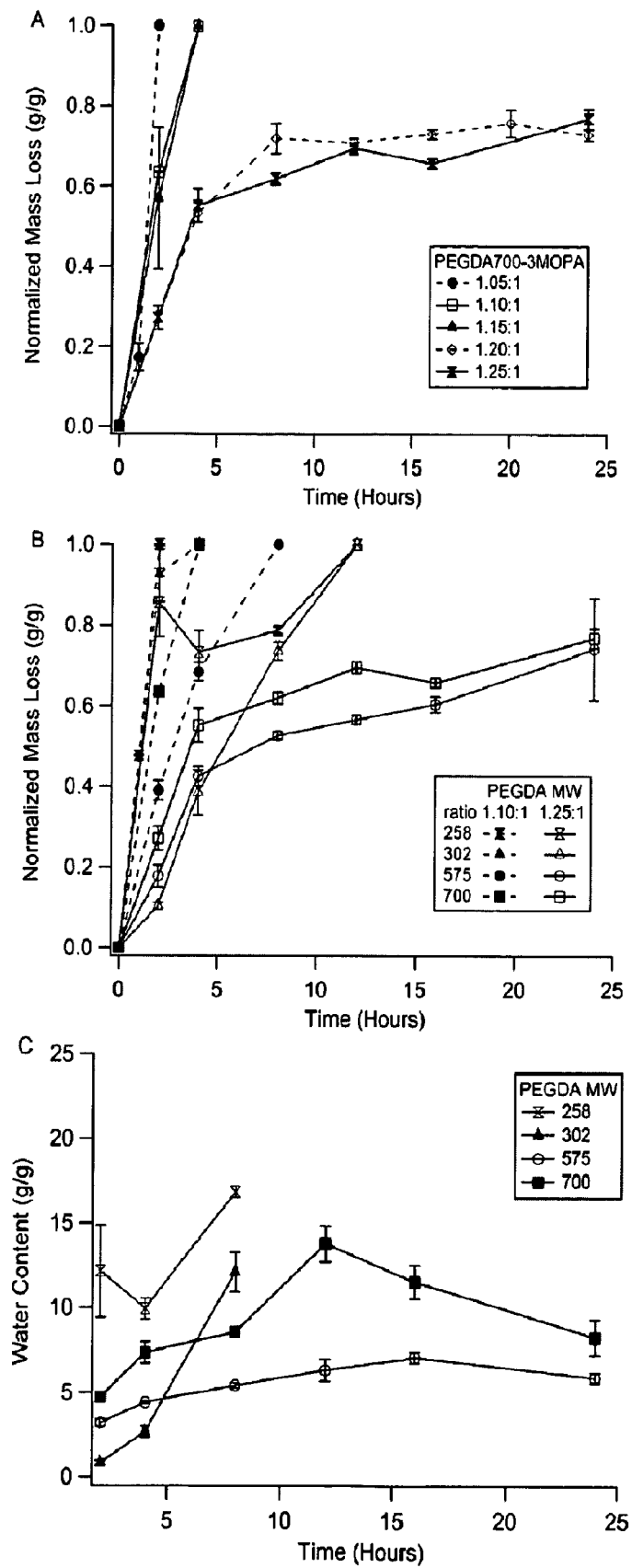
FIG. 38A-C graphically illustrates degradation profiles of polymeric networks, in accordance with exemplary embodiments of the present invention.

The degradation profiles of PEGDA-based materials are presented in FIGS. 38A and B. The degradation profiles for PEGDA700 networks for the 5 different molar ratios are shown in FIG. 38A. The lower PEGDA700 ratios degraded rapidly, while the higher ratios lasted for at least 24 h. The degradation profiles for all PEGDA networks at a ratio of 1.10:1 and 1.25:1 are shown in FIG. 38B. All PEGDA networks at a ratio of 1.10:1 degraded completely within 8 h, while the networks at a ratio of 1.25:1 lasted 12 h or more. The water contents for the four PEGDA networks at a ratio of 1.25:1 are shown in FIG. 38C. The networks with high initial water contents match the networks with rapid degradation.

In this study, the effect diacrylate molecular weight, diacrylate to amine ratio, and diacrylate chemistry on PBAE network properties was explored. The results show that the degradation rate and thermo-mechanical properties are greatly influenced. The two systems, PEGDA-based and DDA-based, were selected for their different history of use and their diverse chemical properties. From a biocompatibility standpoint, PEGDA-based polymers are known for their biocompatibility, and the degradation product containing 3MOPA has yet to be proven harmful. In addition, PEGDA-based systems were chosen due to previous testing of their mechanical properties under cyclical loading. As a comparison, DDA-3MOPA systems were chosen to study the effect of changing the backbone chemistry from hydrophilic to hydrophobic on the thermo-mechanical properties and degradation. The molar ratio range was limited to 1.25:1 to prevent non-degradable crosslinks from forming from excess pure diacrylate. Prior work has demonstrated that the elastic modulus of the network is affected by changes in macromer molecular weight by varying the molar ratio. Here we explore the impact of diacrylate molecular weight and chemistry on step-growth polymerization, photopolymerization, and subsequent properties.

Dynamic mechanical analysis was used as a screening method in order to look at a range of networks of varying crosslinking density and chemistry. A commonality between all these materials is their low Tg, as shown by the large drop in storage modulus in FIGS. 1C and D. The low Tg is due to the lack of steric hindrance usually created from bulky, rigid side groups, and the enhanced flexibility from the ethylene glycol, methylene, or amine groups incorporated into the backbone. Thus, by increasing the diacrylate molecular weight, more flexible groups are being incorporated resulting in the subsequent decrease in Tg. In addition, varying the molar ratio and diacrylate molecular weight and chemistry produced a broad range of rubbery moduli. The rubbery modulus increases as molar ratio increases, thus the crosslinking density increases as the macromer molecular weight decreases due to the increasing molar ratio as shown in FIGS. 1A and B. However, the trends in elastic modulus with diacrylate molecular weight were less obvious and non-monotonic. Low molecular weight diacrylates may be expected to create denser networks, thus having a higher modulus. However, in FIG. 1A, the low molecular weight diacrylates had lower rubbery moduli or in FIG. 1B, the low and high molecular weight diacrylates had similar rubbery moduli. The crystallization and melting of PEGDA700-based networks was not expected, but is possible as the network structure has passed above its Tg in FIG. 31. It also defines a molecular weight boundary, where PEGDA-based networks do not crystallize when PEGDA is below 700 g/mol. Because of these unexpected trends in modulus, a further understanding of both polymerization steps was explored to understand the relation between diacrylate molecular weight and network modulus.

The step-growth polymerization of PEGDA-based networks and DDA-based networks was studied by varying the diacrylate molecular weight and chemistry while maintaining a constant molar ratio of 1.20:1. The networks synthesized from lower molecular weight diacrylates, such as PEGDA258 and PEGDA302, converted to a higher degree and at a faster rate than their higher molecular weight PEGDA counterparts. The increase of diacrylate molecular weight decreases the monomer's mobility thus decreasing the rate and degree of conversion. With a molar ratio of 1.20:1, the conversion would have been expected to be equivalent for all PEGDA-based macromers. The higher degree of conversion for the PEGDA258 and PEGDA302-based macromers may have resulted from termination during the step-growth polymerization from monomers having only one acrylate endgroup instead of two or cyclization of the diacrylate to amine. PEGDA monomers have near 14% impurities comprised of poly(ethylene glycol) chains and monofunctional poly(ethylene glycol) acrylate, where over 10% may be monofunctional poly(ethylene glycol) acrylate. DDA monomers have near 10% impurities, where 3% comprises the monofunctional diol acrylate. These monofunctional acrylate impurities will terminate the step-growth reaction early producing smaller molecules without any acrylate functionality or cause dangling ends which would not be elastically effective. The DDA based networks' rates and degrees of conversion decreased as the diacrylate molecular weight increased again due to decreased mobility. The effect of decreasing rate and degree of conversion as diacrylate molecular weight increases is in agreement with hyperbranched amine-acrylate systems. The macromer molecular weight post-step-growth polymerization is a key determinant of the crosslinking density and thus the rubbery modulus. NMR can provide an estimate based upon the ratio of acrylate endgroups to amine groups and may count cyclization and dangling groups with only one acrylate endgroup. By using NMR, the macromer molecular weight can be compared to the elastically effective molecular weight between crosslinks via DMA. FIGS. 1F and 33B show similar molecular weights for the DDA-based networks, thus they are converting ideally and elastically effective chains are the majority of the chains present. PEGDA575 and PEGDA700-based networks also show similar molecular weights in FIGS. 1E and 34A. The PEGDA258 and PEGDA302-based networks have a drastic difference, where the molecular weight via DMA is much higher. Thus, the step-growth polymerization is producing elastically ineffective chains, which would be comprised of a combination of dangling chains and cycles of low molecular weight as seen in the molecular weight via NMR. The low molecular weight diacrylates are more likely to form cycles as seen in kinetic models and other diacrylate systems, which lowers the formation of crosslinks, thus lowering their modulus. By comparing the repeating unit structure of DDA and PEGDA, PEGDA is the more flexible monomer based on its lower characteristic ratio, where poly (ethylene glycol) and polyethylene have characteristic ratios of 5.6 and 7.4, respectively. This increase in flexibility at nearly the same molecular weight may contribute to the increased cyclization. Because the step-growth polymerization determines the macromer molecular weight and the degree of acrylate conversion, this step will also affect the subsequent polymerization, as will be further discussed.

The second polymerization, the UV-photopolymerization, is responsible for network formation. A critical population of acrylate endgroups is necessary for full network formation. The networks that reached high degrees of photopolymerization were the macromers that did not reach high levels of conversion during their step-growth polymerization. Thus because the PEGDA575 and PEGDA700-based networks reached high levels of photopolymerization conversion, they formed more complete networks and obtained higher rubbery moduli. By examining the macromer molecular weight in combination with the degree of conversion, the arrangement of rubbery moduli in FIG. 1A is made clear. The PEGDA258 and PEGDA575-based networks have nearly different degrees of photopolymerization, and thus possess differing rubbery moduli. Both DDA226 and DDA268-based networks converted to a higher degree during photopolymerization, but DDA226-based network has a lower macromer molecular weight than the DDA268, and thus formed networks with higher rubbery moduli compared with DDA268. The DDA198 converted to a lesser degree during photopolymerization, but still reached similar values of rubbery moduli as the DDA268. The results from the sol fraction, an alternative method of measuring network conversion, are in good agreement with the FTIR-ATR photopolymerization and the rubbery moduli. The networks suspected of having dangling endgroups and cycles, PEGDA258 and PEGDA302-based networks, had the highest sol fractions, thus this lack of network formation further decreased their modulus values.

The results of this study show that the effect of diacrylate molecular weight and chemistry on the polymerization and mechanical properties can be fully understood by considering structure after both the step-growth polymerization and photopolymerization. If the macromers do not reach high conversion during step-growth but obtain a high degree of conversion during photopolymerization, then the effect of diacrylate molecular weight on rubbery moduli can be understood from the macromer molecular weight. If two macromers have the same macromer molecular weight via NMR but convert differently during photopolymerization, then the degree of conversion during photopolymerization will dictate rubbery modulus. The stepgrowth polymerization controls the degree of acrylate conversion necessary for network formation and the macromer molecular weight that influences crosslinking density. The photopolymerization controls network formation, but is greatly influenced by the amount of acrylate endgroups remaining from the step-growth polymerization.

The degradation profiles and water content of the networks are controlled by two different mechanisms. The degradability of DDA-based networks are affected by their diacrylate molecular weight as can be seen in FIG. 37A. All five molar ratios of DDA226 and DDA268 have nearly the same degradation profile, and the 5 M ratios of DDA198 are similar and distinct from the DDA226 and DDA268 networks. It is clearly seen that as the diacrylate molecular weight increases, the degradation rate decreases due to a decrease in water content as shown in FIG. 37B. The water content follows the same trend as the degradation profiles, where the number of methylene units or the diacrylate molecular weight is the controlling factor. The independence of degradation rate from molar ratio, thus rubbery modulus is unexpected because increasing the crosslinking density typically alters the degradation rate.

Unlike the DDA-based networks, the PEGDA-based networks' degradation profiles are controlled less by their diacrylate molecular weight, and more by their molar ratio. The low molar ratios networks are lightly crosslinked thus allowing for large amounts of water to enter the network, which leads to rapid degradation. The higher molar ratios of 1.20:1 and 1.25:1 plateau due to the formation of non-degradable crosslinks and a higher network density. All PEGDA-based networks follow the same trend, regardless of the diacrylate molecular weight. All PEGDA-based networks eventually had water content greater than 500% by the time of full degradation, which is the main cause for their rapid degradation. The dual mechanisms illustrate the difference in backbone chemistry of the diacrylates. Degradation in the DDA-based networks is more controlled by diacrylate molecular weight while degradation in the PEGDA-based networks is dominated by molar ratio. This separation of degradation rate and modulus for the DDA-based networks is significant, where it will allow for enhanced tailoring of these networks for tissue scaffolds and drug release devices.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims

What is claimed is:

1. A three-dimensional polymeric network composition, comprising:
    a biodegradable macromer component photopolymerized with a monofunctional acrylate-containing component, wherein the macromer component comprises a diacrylate-containing component polymerized with an amine-containing component, and wherein a molar ratio of the diacrylate-containing component to the amine-containing component in the macromer component is greater than or equal to 1:1.

2. The composition of claim 1, wherein the diacrylate-containing component comprises one or more diacrylate compositions.

3. The composition of claim 1, wherein the diacrylate-containing component comprises poly(ethylene glycol) diacrylate.

4. The composition of claim 1, wherein the diacrylate-containing component comprises hexanediol diacrylate.

5. The composition of claim 1, wherein the diacrylate-containing component comprises a mixture of poly(ethylene glycol) diacrylate and hexanediol diacrylate.

6. The composition of claim 5, wherein a molar ratio of poly(ethylene glycol) diacrylate to hexanediol diacrylate is less than 1:1.

7. The composition of claim 1, wherein the molar ratio of the diacrylate-containing component to the amine-containing component in the macromer component is about 1.05:1 to about 1.25:1.

8. The composition of claim 1, wherein the amine-containing component comprises 3-methoxypropylamine.

9. The composition of claim 1, wherein the monofunctional acrylate-containing component comprises methyl methacrylate.

10. The composition of claim 1, wherein the composition further comprises a photoiniator.

11. The composition of claim 10, wherein the photoiniator is 2-hydroxy-1-[4-(hydroxyethoxy)phenyl]-2-methyl-1-propanone.

12. The composition of claim 1, wherein the composition comprises about 45 weight percent of the macromer component and about 55 weight percent of the monofunctional acrylate-containing component.

13. The composition of claim 1, wherein the macromer component is poly(ethylene glycol) diacrylate and hexanediol diacrylate polymerized with 3-methoxypropylamine and the monofunctional acrylate-containing component is methyl methacrylate.

14. The composition of claim 1, further comprising an active agent.

15. The composition of claim 1, wherein the monofunctional acrylate-containing component has a higher glass transition temperature than the macromer component.

16. The composition of claim 15, wherein the glass transition temperature of the monofunctional acrylate-containing component is at least 20 degrees high than the glass transition temperature of the macromer component.

17. The three-dimensional polymeric network composition of claim 1 made by a method comprising:
polymerizing a diacrylate-containing component with an amine-containing component to form a biodegradable macromer component; and
photopolymerizing the macromer component with a monofunctional acrylate-containing component.

18. The composition of claim 17, further comprising mixing two or more diacrylate compositions to produce the diacrylate-containing component.

19. The composition of claim 17, further comprising disposing an active agent in the macromer and monofunctional acrylate-containing components.

20. The composition of claim 17, wherein the diacrylate-containing component comprises poly(ethylene glycol) diacrylate.

21. The composition of claim 17, wherein the diacrylate-containing component comprises hexanediol diacrylate.

22. The composition of claim 17, wherein the diacrylate-containing component comprises poly(ethylene glycol) diacrylate and hexanediol diacrylate.

23. The composition of claim 17, wherein the molar ratio of the diacrylate-containing component to the amine-containing component in the macromer component is about 1.05:1 to about 1.25:1.

24. The composition of claim 17, wherein the composition comprises about 45 weight percent of the macromer component and about 55 weight percent of the monofunctional acrylate-containing component.

* * * * *